United States Patent
You et al.

(10) Patent No.: US 9,553,704 B2
(45) Date of Patent: Jan. 24, 2017

(54) METHOD AND USER EQUIPMENT FOR RECEIVING REFERENCE SIGNALS, AND METHOD AND BASE STATION FOR TRANSMITTING REFERENCE SIGNALS

(71) Applicant: LG ELECTRONICS INC., Seoul (KR)

(72) Inventors: Hyangsun You, Anyang-si (KR); Yunjung Yi, Anyang-si (KR); Joonkui Ahn, Anyang-si (KR); Suckchel Yang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 110 days.

(21) Appl. No.: 14/382,701

(22) PCT Filed: Mar. 8, 2013

(86) PCT No.: PCT/KR2013/001908
§ 371 (c)(1),
(2) Date: Sep. 3, 2014

(87) PCT Pub. No.: WO2013/133673
PCT Pub. Date: Sep. 12, 2013

(65) Prior Publication Data
US 2015/0023331 A1 Jan. 22, 2015

Related U.S. Application Data

(60) Provisional application No. 61/608,578, filed on Mar. 8, 2012, provisional application No. 61/617,625, filed
(Continued)

(51) Int. Cl.
*H04L 5/00* (2006.01)
*H04W 56/00* (2009.01)
(Continued)

(52) U.S. Cl.
CPC .......... *H04L 5/0048* (2013.01); *H04L 5/0007* (2013.01); *H04L 5/0053* (2013.01); *H04W 56/00* (2013.01);
(Continued)

(58) Field of Classification Search
CPC ...... H04L 5/0048; H04L 5/001; H04L 5/0023; H04L 5/0053; H04L 5/0073; H04L 5/1469; H04L 5/0007; H04L 5/14; H04W 56/00; H04W 48/12; H04W 16/14; H04W 72/04; H04W 72/0446; H04W 72/048; H04W 72/0493; H04W 74/006
(Continued)

(56) References Cited

U.S. PATENT DOCUMENTS 8,363,627 B2 * 1/2013 Trainin ................. H04L 5/1453
370/318
8,462,676 B2 * 6/2013 Ahmadi ................ H04L 5/0007
370/295
(Continued)

FOREIGN PATENT DOCUMENTS

KR 10-2010-0101510 A 9/2010
KR 10-2010-0118065 A 11/2010
(Continued)

*Primary Examiner* — Raj Jain
(74) *Attorney, Agent, or Firm* — Birch, Stewart, Kolasch & Birch, LLP

(57) ABSTRACT

According to the present invention, a common reference signal is transmitted in a subframe configured to receive the common reference signal and/or a fixed subframe predefined to receive the common reference signal, from among a plurality of subframes within a frame. In the present invention, the common reference signal is transmitted in every subframe within a legacy frame duration. However, the common reference signal is transmitted in said configured
(Continued)

subframe and/or said fixed subframe within a frame duration which is not a legacy frame duration.

20 Claims, 17 Drawing Sheets

Related U.S. Application Data on Mar. 29, 2012, provisional application No. 61/635,269, filed on Apr. 18, 2012.

(51) Int. Cl.
| | | |
|---|---|---|
| H04W 16/14 | (2009.01) | |
| H04W 72/04 | (2009.01) | |
| H04L 5/14 | (2006.01) | |

(52) U.S. Cl.
CPC .............. *H04L 5/001* (2013.01); *H04L 5/0023* (2013.01); *H04L 5/0073* (2013.01); *H04L 5/1469* (2013.01); *H04W 16/14* (2013.01); *H04W 72/0446* (2013.01)

(58) Field of Classification Search
USPC .................................................. 370/329, 336
See application file for complete search history.

(56) References Cited

U.S. PATENT DOCUMENTS

| | | | | |
|---|---|---|---|---|
| 8,634,385 | B2* | 1/2014 | Papasakellariou | H04L 5/0023 370/334 |
| 2005/0181800 | A1* | 8/2005 | Trachewsky | H04L 5/1438 455/452.1 |
| 2009/0252082 | A1* | 10/2009 | Chang | H04W 74/006 370/315 |
| 2010/0271965 | A1* | 10/2010 | Siomina | H04L 5/0048 370/252 |
| 2011/0044391 | A1* | 2/2011 | Ji | H04L 5/0007 375/260 |
| 2011/0103338 | A1* | 5/2011 | Astely | H04J 11/0069 370/329 |
| 2011/0206157 | A1* | 8/2011 | Xu | H04L 5/0051 375/295 |
| 2012/0039183 | A1* | 2/2012 | Barbieri | H04W 16/14 370/241.1 |
| 2012/0039232 | A1 | 2/2012 | Kwon et al. | |
| 2012/0039284 | A1* | 2/2012 | Barbieri | H04W 48/10 370/329 |
| 2012/0044896 | A1 | 2/2012 | Kwon et al. | |
| 2012/0057498 | A1 | 3/2012 | Han et al. | |
| 2012/0063374 | A1* | 3/2012 | Lim | H04L 27/2602 370/281 |
| 2012/0106374 | A1* | 5/2012 | Gaal | H04L 5/0048 370/252 |
| 2012/0113816 | A1* | 5/2012 | Bhattad | H04L 5/0032 370/246 |
| 2012/0220333 | A1* | 8/2012 | Zhu | H04B 7/061 455/525 |
| 2012/0282936 | A1* | 11/2012 | Gao | H04L 5/0023 455/450 |
| 2013/0003663 | A1* | 1/2013 | Blankenship | H04L 5/0053 370/329 |
| 2013/0028199 | A1* | 1/2013 | Song | H04W 16/12 370/329 |
| 2013/0039254 | A1 | 2/2013 | Kim et al. | |
| 2013/0044678 | A1* | 2/2013 | Qu | H04W 52/244 370/328 |
| 2013/0301597 | A1* | 11/2013 | Kim | H04W 72/042 370/329 |
| 2014/0064133 | A1* | 3/2014 | Kazmi | H04W 24/10 370/252 |
| 2015/0139138 | A1 | 5/2015 | Seo et al. | |

FOREIGN PATENT DOCUMENTS

| | | |
|---|---|---|
| KR | 10-2010-0120260 A | 11/2010 |
| KR | 10-2011-0019330 A | 2/2011 |
| WO | WO 2010/056035 A2 | 5/2010 |
| WO | WO 2010/104321 A2 | 9/2010 |
| WO | WO 2011/139114 A2 | 11/2011 |

\* cited by examiner

FIG. 10
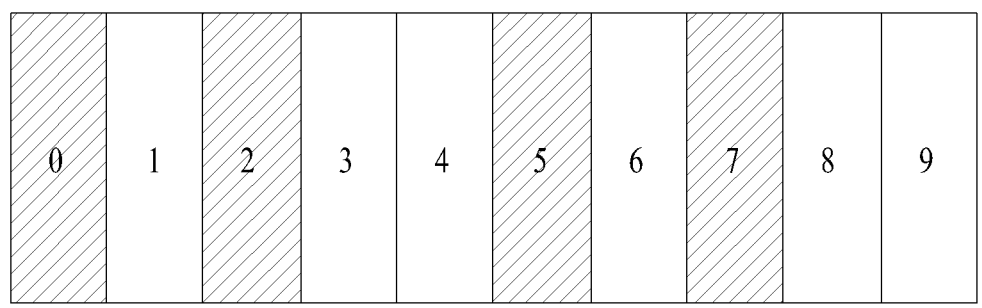
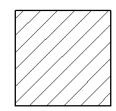 CRS subframe (a) (b) (c) (d)

FIG. 16
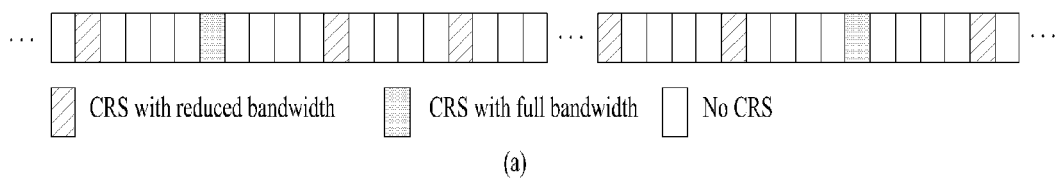
(a)
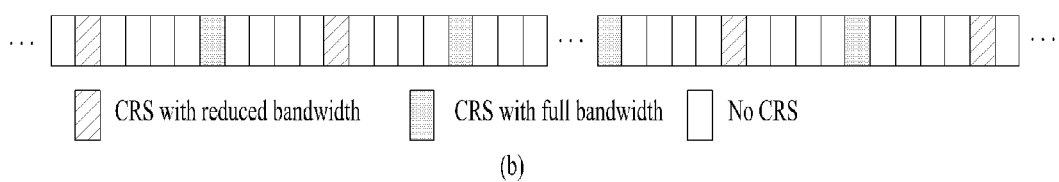
(b)

METHOD AND USER EQUIPMENT FOR RECEIVING REFERENCE SIGNALS, AND METHOD AND BASE STATION FOR TRANSMITTING REFERENCE SIGNALS

CROSS REFERENCE TO RELATED APPLICATIONS

This application is the National Phase of PCT/KR2013/001908 filed on Mar. 8, 2013, which claims priority under 35 U.S.C. 119(e) to U.S. Provisional Application No. 61/608,578 filed on Mar. 8, 2012, to U.S. Provisional Application No. 61/617,625 filed on Mar. 29, 2012 and to U.S. Provisional Application No. 61/635,269 filed on Apr. 18, 2012, all of which are incorporated by reference herein in its entirety.

TECHNICAL FIELD

The present invention relates to a wireless communication system and, more particularly, to a method and apparatus for transmitting a reference signal of a carrier and a method and apparatus for receiving the reference signal of the carrier.

BACKGROUND ART

In a wireless communication system, a user equipment (UE) may receive data and/or various control information from a base station (BS) through downlink (DL) and transmit data and/or various control information to the BS through uplink (UL). In order to communicate with a BS, a UE needs to establish synchronization with the BS. To this end, a UE, which is turned on from a power-off state or newly enters a cell which is a geographic region served by a BS, performs initial cell search accompanying operation such as synchronization establishment with the BS. Upon completion of initial cell search, the UE may receive data and/or control information through a physical downlink channel and transmit data and/or control information through a physical uplink channel.

Due to various reasons including cell search, maintenance of time synchronization after synchronization between a UE and a BS, and correction of a frequency offset, a wireless communication system discussed up to now defines transmission/reception of various mandatory signals on designated radio resources.

The types and number of these mandatory signals have increased with the advance of the wireless communication system. Since signals other than the mandatory signals cannot be allocated to radio resources to which the mandatory signals are allocated, the mandatory signals increasing in accordance with the advance of the wireless communication system hinder the degree of freedom of scheduling of the wireless communication system and also restricts introduction of more efficient communication technology for the wireless communication system.

DETAILED DESCRIPTION OF THE INVENTION

Technical Problems

Recently, configuration of new carriers which are free from restrictions of mandatory signals defined up to now has been considered. A method and/or apparatus for configuring or recognizing the new carriers while maintaining compatibility with an apparatus configured according to a legacy system are needed.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method for receiving a reference signal by a user equipment. The user equipment may receive a common reference signal in at least one of a subframe corresponding to subframe configuration for reception of the common reference signal (hereinafter, a configured subframe) and a subframe predefined for reception of the common reference signal (hereinafter, a fixed subframe) among a plurality of subframes in a frame. The use equipment may receive information indicating the subframe configuration.

In another aspect of the present invention, provided herein is a user equipment including a radio frequency (RF) unit and a processor configured to control the RF unit. The processor may control the RF unit to receive a common reference signal in at least one of a subframe corresponding to subframe configuration for reception of the common reference signal (hereinafter, a configured subframe) and a subframe predefined for reception of the common reference signal (hereinafter, a fixed subframe) among a plurality of subframes in a frame. The user equipment may receive information indicating the subframe configuration.

In another aspect of the present invention, provided herein is a method for transmitting a reference signal by a base station. The base station may transmit a common reference signal in at least one of a subframe corresponding to subframe configuration for transmission of the common reference signal (hereinafter, a configured subframe) and a subframe predefined for transmission of the common reference signal (hereinafter, a fixed subframe) among a plurality of subframes in a frame. The base station may transmit information indicating the subframe configuration.

In another aspect of the present invention, provided herein is a base station including a radio frequency (RF) unit and a processor configured to control the RF unit. The processor may control the RF unit to transmit a common reference signal in at least one of a subframe corresponding to subframe configuration for transmission of the common reference signal (hereinafter, a configured subframe) and a subframe predefined for transmission of the common reference signal (hereinafter, a fixed subframe) among a plurality of subframes in a frame. The processor may control the RF unit to transmit information indicating the subframe configuration.

In each aspect of the present invention, information indicating a frame duration during which each subframe includes a common reference signal of each antenna port (hereinafter, a legacy frame duration) or a frame duration other than the legacy frame duration (hereinafter, a new frame duration) may be transmitted to the user equipment.

In each aspect of the present invention, during the legacy frame duration, the common reference signal of each antenna may be transmitted in every subframe and, during the new frame duration, the common reference signal may be transmitted in at least one of the configured subframe and the fixed subframe.

In each aspect of the present invention, the fixed subframe may include at least one of subframes including a synchronization signal.

In each aspect of the present invention, the fixed subframe may include at least one of 0th and 5th subframes among 10 subframes in a radio frame.

In each aspect of the present invention, the common reference signal and the synchronization signal may be transmitted through the same antenna port.

In each aspect of the present invention, the common reference signal and the synchronization signal may be transmitted in a state satisfying a predetermined condition.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, new carriers which are free from restrictions of mandatory signals of a legacy system while maintaining compatibility with a legacy system can be configured.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIGS. 9 to 11 illustrate methods for configuring subframes for common reference signals (CRSs) according to the present invention.

FIGS. 13 to 16 illustrate frame structures for CRS subframes according to embodiments of the present invention.

MODE FOR INVENTION

Figure 1:
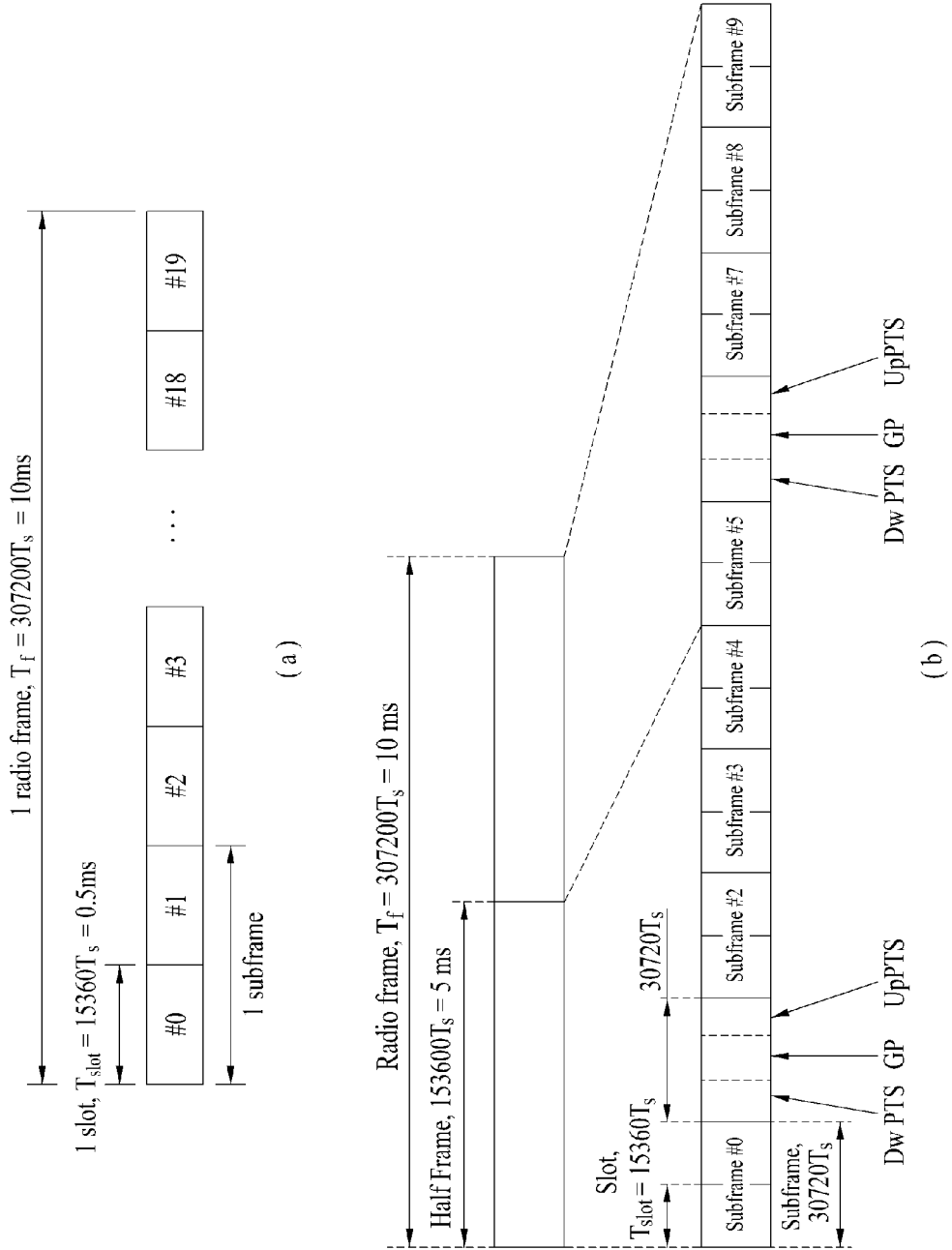
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

For convenience of description, while detailed embodiments of the present invention will be described based on 3rd generation partnership project (3GPP) long term evolution (LTE) or 3GPP LTE-advanced (LTE-A), the present invention is applicable to other wireless communication systems as well as an LTE/LTE-A system.

Hereinafter, detailed embodiments of the present invention will be described by referring to a carrier configured according to legacy wireless communication standards as a legacy carrier type (LCT) carrier, an LCT component carrier (CC), or a normal carrier and referring to a carrier configured according to fewer restrictions relative to restrictions of the LCT carrier as a new carrier type (NCT) carrier, an NCT CC, or an extended carrier.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, a node may not be an eNB. For example, a radio remote head (RRH) or a radio remote unit (RRU) may be a node. The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio link. At least one antenna is installed per node. The antenna may mean a physical antenna, an antenna port, a virtual antenna, or an antenna group. A node may be referred to as a point.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a downlink/uplink signal of a specific cell refers to a downlink/uplink signal from/to an eNB or a node which provides a communication service to the specific cell. Furthermore, channel status/quality of a specific cell refers to channel status/quality of a channel or communication link formed between an eNB or node which provides a communication service to the specific cell and a UE. In a 3GPP LTE-A based system, the UE may measure a downlink channel state from a specific node using channel state information-reference signal(s) (CSI-RS(s)) transmitted on a CSI-RS resource allocated to the specific node by antenna port(s) of the specific node. Meanwhile, a 3GPP LTE/LTE-A system uses the concept of a cell in order to manage radio resources and a cell associated with the radio resources is distinguished from a cell of a geographic region. The cell associated with the radio resources will be described later with reference to FIG. 8.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS, a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (HACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinbelow, an OFDM symbol/subcarrier/RE to or for which a CRS/DMRS/CSI-RS/SRS/UE-specific RS is allocated or configured will be referred to as a CRS/DMRS/CSI-RS/SRS/UE-specific RS symbol/carrier/subcarrier/RE. For instance, a symbol to which a CSI-RS is allocated is referred to as a CSI-RS symbol, a subcarrier to which a CSI-RS is allocated is referred to as a CSI-RS subcarrier, and an RE to which a CSI-RS is allocated is referred to as a CSI-RS RE. In addition, a subframe configured for CSI-RS transmission is referred to as a CRS-RS subframe. Furthermore, a subframe in which a broadcast signal is transmitted is referred to as a broadcast subframe or a PBCH subframe and a subframe in which a synchronization signal (e.g. a PSS and/or an SSS) is transmitted is referred to as a synchronization signal subframe or a PSS/SSS subframe. An OFDM symbol/subcarrier/RE to or for which a PSS/SSS is allocated or configured is referred to as a PSS/SSS symbol/subcarrier/RE.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms ($307,200T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since downlink (DL) transmission and uplink (UL) transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configuration | Downlink-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
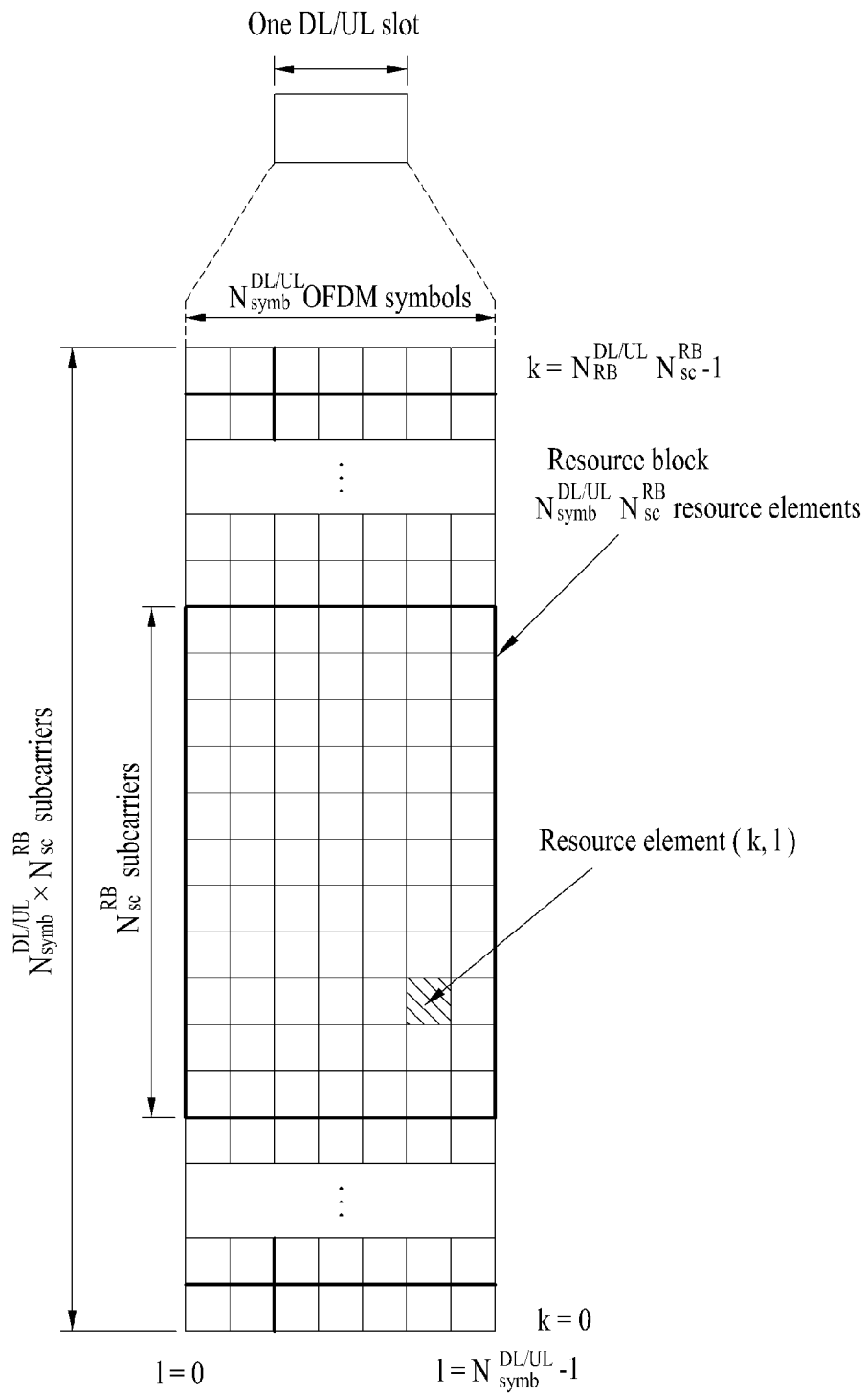
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and l is an index ranging from 0 to $N^{DL/UL}_{symb}1-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

In order for a UE to receive a signal from an eNB or transmit a signal to the eNB, the UE should be synchronized with the eNB in time/frequency. This is because the UE can determine time and frequency parameters necessary for performing demodulation of a DL signal and transmission of a UL signal at an accurate time only after the UE is synchronized with the eNB.

Figure 3:
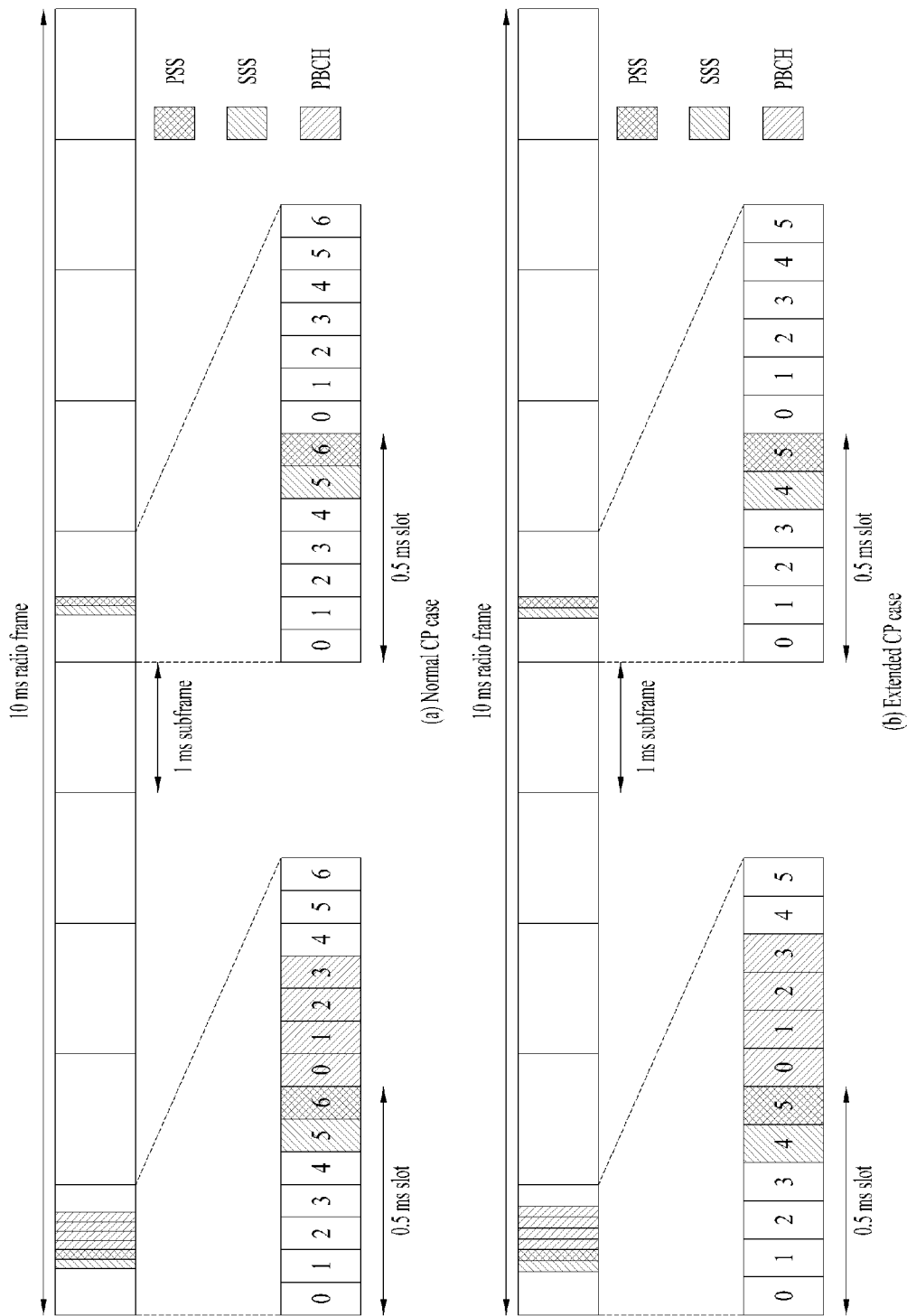
FIG. 3 illustrates a radio frame structure for transmission of a synchronization signal (SS).

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined. That is, a single antenna port transmission scheme or a transmission scheme transparent to a UE (e.g. precoding vector switching (PVS), time switched transmit diversity (TSTD), or cyclic delay diversity (CDD)) may be used for transmit diversity of an SS.

An SS may represent a total of 504 unique physical layer cell IDs by a combination of 3 PSSs and 168 SSSs. In other words, the physical layer cell IDs are divided into 168 physical layer cell ID groups each including three unique IDs so that each physical layer cell ID is a part of only one physical layer cell ID group. Accordingly, a physical layer cell ID $N^{cell}_{ID}(=3N^{(1)}_{ID}+N^{(2)}_{ID})$ is uniquely defined as number $N^{(1)}_{ID}$ in the range of 0 to 167 indicating a physical layer cell ID group and number $N^{(2)}_{ID}$ from 0 to 2 indicating the physical layer ID in the physical layer cell ID group. A UE may be aware of one of three unique physical layer IDs by detecting the PSS and may be aware of one of 168 physical layer cell IDs associated with the physical layer ID by detecting the SSS. A length-63 Zadoff-Chu (ZC) sequence is defined in the frequency domain and is used as the PSS. As an example, the ZC sequence may be defined by the following equation.

$$d_u(n) = e^{-j\frac{\pi u n(n+1)}{N_{ZC}}} \quad \text{[Equation 1]}$$

where $N_{ZC}=63$ and a sequence element corresponding to a DC subcarrier, n=31, is punctured.

The PSS is mapped to 6 RBs (=72 subcarriers) near to a center frequency. Among the 72 subcarriers, 9 remaining subcarriers carry a value of always 0 and serve as elements facilitating filter design for performing synchronization. To define a total of three PSSs, u=24, 29, and 34 are used in Equation 1. Since u=24 and u=34 have a conjugate symmetry relation, two correlations may be simultaneously performed. Here, conjugate symmetry indicates the relationship of the following Equation.

$d_u(n)=(-1)^n(d_{N_{ZC}-u}(n))^*$, when $N_{ZC}$ is even number $d_u(n)=(d_{N_{ZC}-u}(n))^*$, when $N_{ZC}$ is odd number  [Equation 2]

A one-shot correlator for u=29 and u=34 may be implemented using the characteristics of conjugate symmetry. The entire amount of calculation can be reduced by about 33.3% as compared with the case without conjugate symmetry.

In more detail, a sequence d(n) used for a PSS is generated from a frequency-domain ZC sequence as follows.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 3]}$$

In Equation 3, the Zadoff-Chu root sequence index u is given by the following table.

TABLE 3

| $N_{ID}^{(2)}$ | Root index u |
| --- | --- |
| 0 | 25 |
| 1 | 29 |
| 2 | 34 |

Referring to FIG. 3, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

Figure 4:
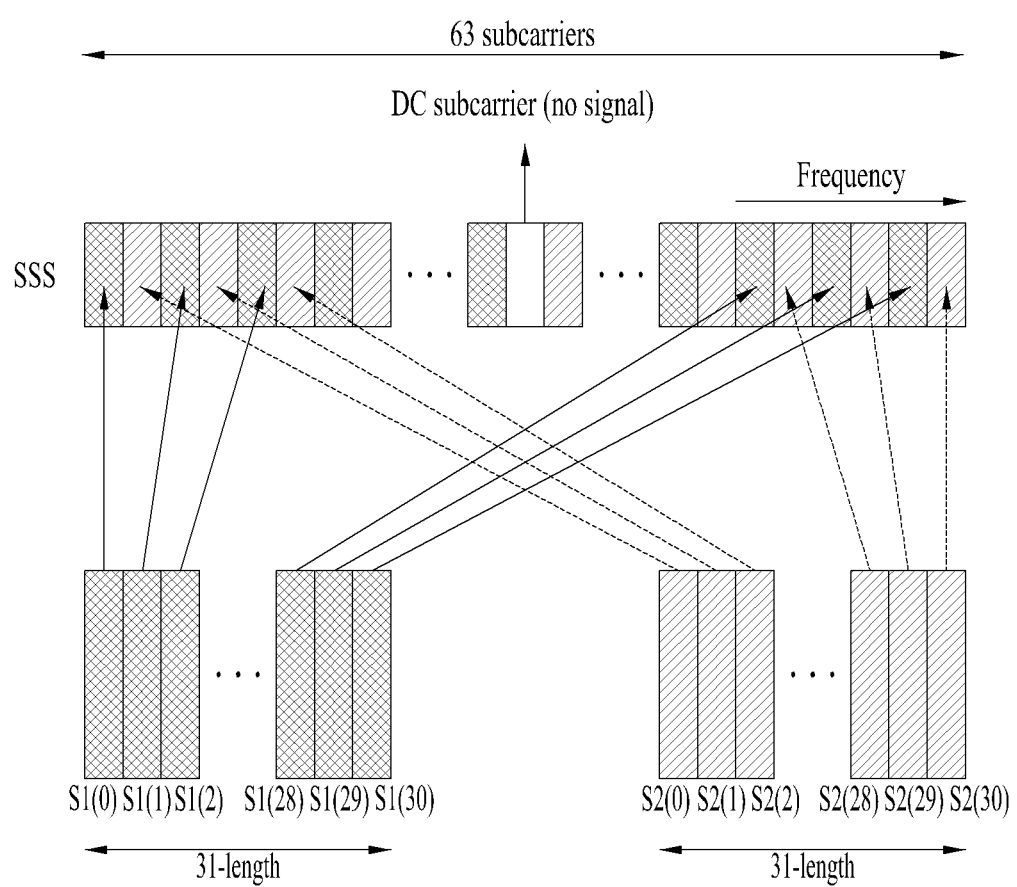
FIG. 4 illustrates a secondary synchronization signal (SSS) generation scheme.

FIG. 4 illustrates an SSS generation scheme. Specifically, FIG. 4 illustrates a relationship of mapping of two sequences in a logical domain to sequences in a physical domain.

A sequence used for the SSS is an interleaved concatenation of two length-31 m-sequences of and the concatenated sequence is scrambled by a scrambling sequence given by a PSS. Here, an m-sequence is a type of a pseudo noise (PN) sequence.

Referring to FIG. 4, if two m-sequences used for generating an SSS code are S1 and S2, then two different PSS-based sequences S1 and S2 are scrambled into to the SSS. In this case, S1 and S2 are scrambled by different sequences. A PSS-based scrambling code may be obtained by cyclically shifting an m-sequence generated from a polynomial of $x^5+x^3+1$ and 6 sequences are generated by cyclic shift of the m-sequence according to an index of a PSS. Next, S2 is scrambled by an S1-based scrambling code. The S1-based scrambling code may be obtained by cyclically shifting an m-sequence generated from a polynomial of $x^5+x^4+x^2+x^1+1$ and 8 sequences are generated by cyclic shift of the m-sequence according to an index of S1. The SSS code is swapped every 5 ms, whereas the PSS-based scrambling code is not swapped. For example, assuming that an SSS of subframe 0 carries a cell group ID by a combination of (S1, S2), an SSS of subframe 5 carries a sequence swapped as (S2, S1). Hence, a boundary of a radio frame of 10 ms can be discerned. In this case, the used SSS code is generated from a polynomial of $x^5+x^2+1$ and a total of 31 codes may be generated by different cyclic shifts of an m-sequence of length-31.

A combination of two length-31 m-sequences for defining the SSS is different in subframe 0 and subframe 5 and a total of 168 cell group IDs are expressed by a combination of the two length-31 m-sequences. The m-sequences used as sequences of the SSS have a robust property in a frequency selective environment. In addition, since the m-sequences can be transformed by high-speed m-sequence transform using fast Hadamard transform, if the m-sequences are used as the SSS, the amount of calculation necessary for a UE to interpret the SSS can be reduced. Since the SSS is configured by two short codes, the amount of calculation of the UE can be reduced.

Generation of the SSS will now be described in more detail. A sequence $d(0), \ldots, d(61)$ used for the SSS is an interleaved concatenation of two length-31 binary sequences. The concatenated sequence is scrambled by a sequence given by the PSS.

A combination of two length-31 sequences for defining the PSS becomes different in subframe 0 and subframe 5 according to the following.

$$d(2n) = \begin{cases} s_0^{(m_0)}(n)c_0(n) & \text{in subframe 0} \\ s_1^{(m_1)}(n)c_0(n) & \text{in subframe 5} \end{cases}$$ [Equation 4]

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In Equation 4, $0 \leq n \leq 30$. The indices $m_0$ and $m_1$ are derived from the physical-layer cell-identity group $N^{(1)}_{ID}$ according to the following.

$$m_0 = m' \bmod 31$$ [Equation 5]
$$m_1 = (m_0 + \lfloor m'/31 \rfloor + 1) \bmod 31$$
$$m' = N^{(1)}_{ID} + q(q+1)/2,$$
$$q = \left\lfloor \frac{N^{(1)}_{ID} + q'(q'+1)/2}{30} \right\rfloor,$$
$$q' = \lfloor N^{(1)}_{ID}/30 \rfloor$$

The output of Equation 5 is listed in Table 4 following Equation 11.

The two sequences $s^{(m_0)}_0(n)$ and $s^{(m_1)}_1(n)$ are defined as two different cyclic shifts of the m-sequence $s(n)$.

$$s_0^{(m_0)}(n) = s((n+m_0) \bmod 31)$$

$$s_1^{(m_1)}(n) = s((n+m_1) \bmod 31)$$ [Equation 6]

In Equation 6, $s(i)=1-2x(i)$, $0 \leq i \leq 30$, is defined by the following equation with initial conditions $x(0)=0$, $x(1)=0$, $x(2)$, $x(3)=0$, $x(4)=1$.

$$x(\bar{i}+5)=(x(\bar{i}+3)+x(\bar{i})) \bmod 2, 0 \leq \bar{i} \leq 25$$ [Equation 7]

The two scrambling sequences $c_0(n)$ and $c_1(n)$ depend on the PSS and are defined by two different cyclic shifts of the m-sequence $c(n)$ according to the following equation.

$$c_0(n)=c((n+N^{(2)}_{ID}) \bmod 31)$$

$$c_1(n)=c((n+N^{(2)}_{ID}+3) \bmod 31)$$ [Equation 8]

In Equation 8, $N^{(2)}_{ID} \in \{0,1,2\}$ is the physical-layer identity within the physical-layer cell identity group $N^{(1)}_{ID}$ and $c(i)=1-2x(i)$ ($0 \leq i \leq 30$), is defined by the following equation with initial conditions $x(0)=0$, $x(1)=0$, $x(2)$, $x(3)=0$, $x(4)=1$.

$$x(\bar{i}+5)=(x(\bar{i}+3)+x(\bar{i})) \bmod 2, 0 \leq \bar{i} \leq 25$$ [Equation 9]

The scrambling sequences $z^{(m_0)}_1(n)$ and $z^{(m_1)}_1(n)$ are defined by a cyclic shift of the m-sequence $z(n)$ according to the following equation.

$$z_1^{(m_0)}(n)=z((n+(m_0 \bmod 8)) \bmod 31)$$

$$z_1^{(m_1)}(n)=z((n+(m_1 \bmod 31)) \bmod 31)$$ [Equation 10]

In Equation 10, $m_0$ and $m_1$ are obtained from Table 4 following Equation 11 and $z(i)=1-2x(i)$, $0 \leq i \leq 30$, is defined by the following equation with initial conditions $x(0)=0$, $x(1)=0$, $x(2)$, $x(3)=0$, $x(4)=1$.

$$x(\bar{i}+5)=(x(\bar{i}+4)+x(\bar{i}+2)+x(\bar{i}+1)+x(\bar{i})) \bmod 2, 0 \leq \bar{i} \leq 25$$ [Equation 11]

TABLE 4

| $N_{ID}^{(1)}$ | $m_0$ | $m_1$ |
| --- | --- | --- |
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |

TABLE 4-continued

| $N_{ID}^{(1)}$ | $m_0$ | $m_1$ |
|---|---|---|
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB8 according to included parameters. The MIB includes most frequency transmitted parameters which are essential for initial access of the UE to a network of the eNB. SIB1 includes parameters needed to determine if a specific cell is suitable for cell selection, as well as information about time-domain scheduling of the other SIBs The UE may receive the MIB through a broadcast channel (e.g. a PBCH). The MIB includes DL bandwidth (BW), PHICH configuration, and a system frame number SFN.

Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The PBCH is mapped to four subframes during 40 ms. The time of 40 ms is blind-detected and explicit signaling about 40 ms is not separately present. In the time domain, the PBCH is transmitted on OFDM symbols 0 to 3 of slot 1 in subframe 0 (the second slot of subframe 0) of a radio frame.

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, a UE which has accessed a network of an eNB may acquire more detailed system information by receiving a PDCCH and a PDSCH according to information carried on the PDCCH. The UE which has performed the above-described procedure may perform reception of a PDCCH/PDSCH and transmission of a PUSCH/PUCCH as a normal UL/DL signal transmission procedure.

Figure 5:
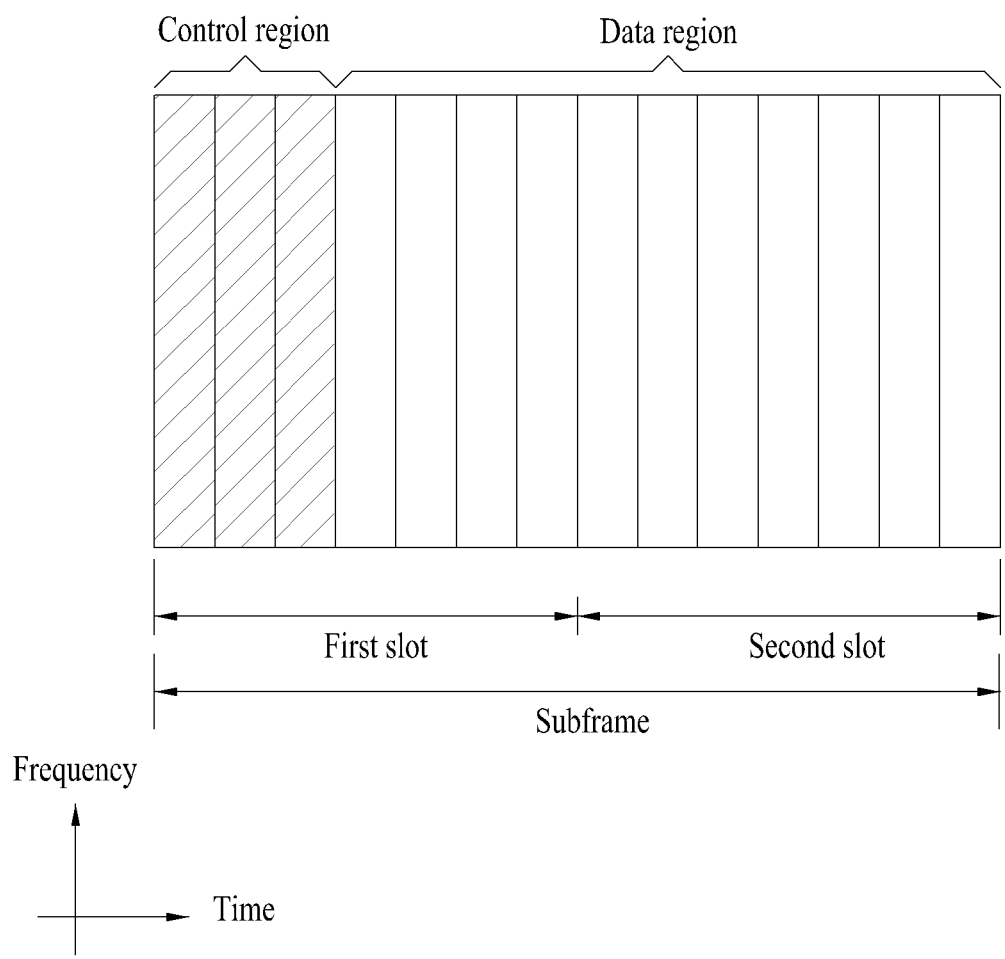
FIG. 5 illustrates the structure of a DL subframe used in a wireless communication system.

FIG. 5 illustrates the structure of a DL subframe used in a wireless communication system.

A DL subframe is divided into a control region and a data region in the time domain. Referring to FIG. 5, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, Paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at a bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped into each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). The number of DCI formats and DCI bits is determined in accordance with the number of CCEs. CCEs are numbered and used consecutively. In order to simplify a decoding process, the PDCCH having a format that includes n CCEs may only start on a CCE having a CCE number corresponding to a multiple of n. The number of CCEs used for transmission of a specific PDCCH is determined by the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs may have different sizes and a dedicated SS and a common SS are defined. The dedicated SS is a UE-specific SS and is configured for each individual UE. The common SS is configured for a plurality of UEs. All UEs receive information about the common SS. An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

RSs may be categorized into RSs for demodulation and RSs for channel measurement according to role of RSs. Among RSs defined in a current 3GPP LTE/LTE-A system, a cell-specific RS is used for both demodulation and channel measurement, a UE-specific RS is used for demodulation and, a CSI-RS may be used to derive channel state information. Meanwhile, RSs are divided into a dedicated RS (DRS) and a common RS (CRS) according to whether a UE recognizes presence thereof. The DRS is known only to a specific UE and the CRS is known to all UEs. Among RSs defined in the current 3GPP LTE/LTE-A system, the cell-specific RS may be considered a sort of the CRS and the UE-specific RS may be considered a sort of the DRS.

Figure 6:
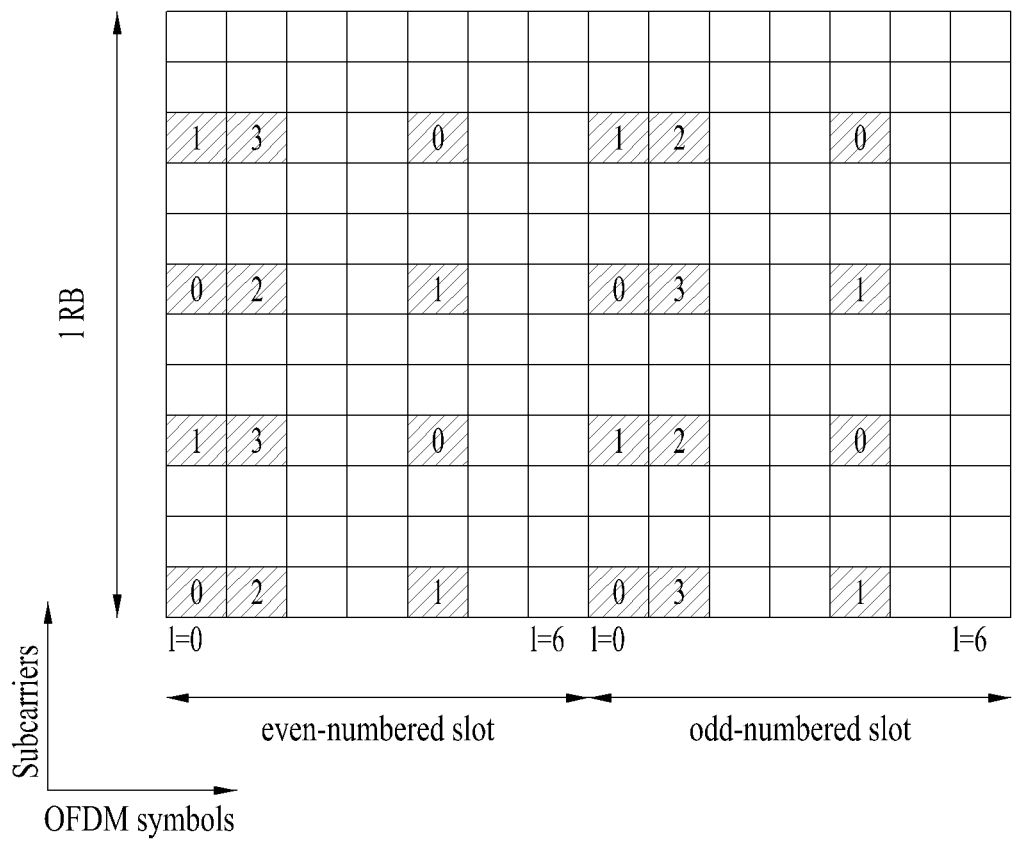
FIG. 6 illustrates configuration of cell specific common reference signals (CRSs).

FIG. 6 illustrates configuration of CRSs. Especially, FIG. 6 illustrates a CRS structure for a 3GPP LTE system supporting a maximum of four antennas.

$$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

where k denotes a subcarrier index, l denotes an OFDM symbol index, p denotes an antenna port number, and $N_{RB}^{max,DL}$ denotes the largest DL bandwidth configuration, expressed as an integer multiple of $N_{sc}^{RB}$.

Parameters v and $v_{shift}$ define locations for different RSs in the frequency domain and v is given as follows.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases} \quad \text{[Equation 13]}$$

where $n_s$ denotes a slot number in a radio frame and a cell-specific frequency shift is given as follows.

$$v_{shift} = N_{ID}^{cell} \bmod 6 \quad \text{[Equation 14]}$$

Referring to FIG. 6 and Equations 12 and 13, current 3GPP LTE/LTE-A standards demand that a cell-specific CRS used for demodulation and channel measurement among various RSs defined in the system be transmitted over all DL bands in all DL subframes. Since, in the 3GPP LTE/LTE-A system, the cell-specific CRS is also used for demodulation of a DL data signal, the cell-specific CRS is transmitted through all antenna ports for DL transmission.

Meanwhile, the cell-specific CRS is used not only for channel state measurement and data demodulation but also for tracking of a UE such as time synchronization maintenance and frequency offset correction after an eNB acquires time synchronization and frequency synchronization used for communication with the UE.

Figure 7:
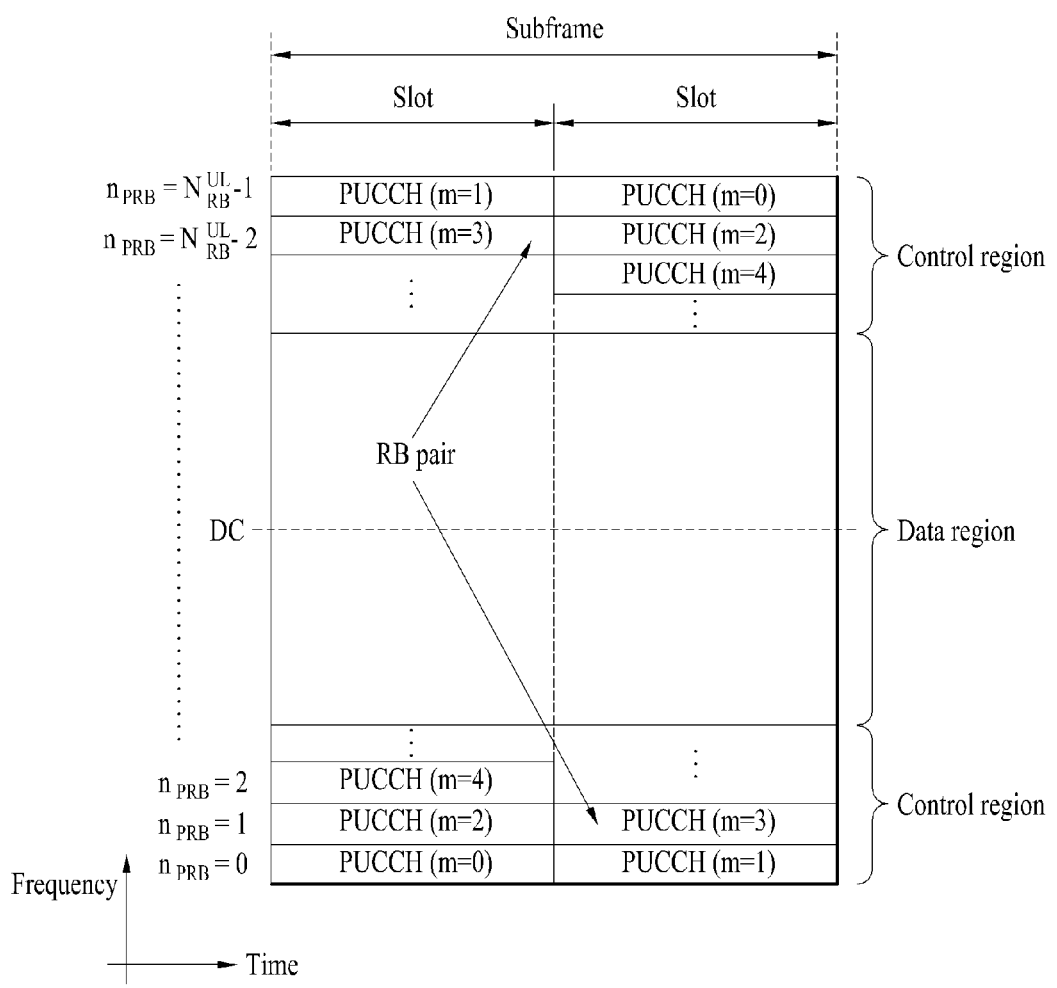
FIG. 7 illustrates the structure of a UL subframe used in a wireless communication system.

FIG. 7 illustrates the structure of a UL subframe used in a wireless communication system.

Referring to FIG. 7, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.
  Scheduling request (SR): SR is information used to request a UL-SCH resource and is transmitted using an on-off keying (OOK) scheme.
  HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.
  Channel state information (CSI): CSI is feedback information for a DL channel. MIMO-related feedback information includes a rank indicator (RI) and a precoding matrix indicator (PMI).

Figure 8:
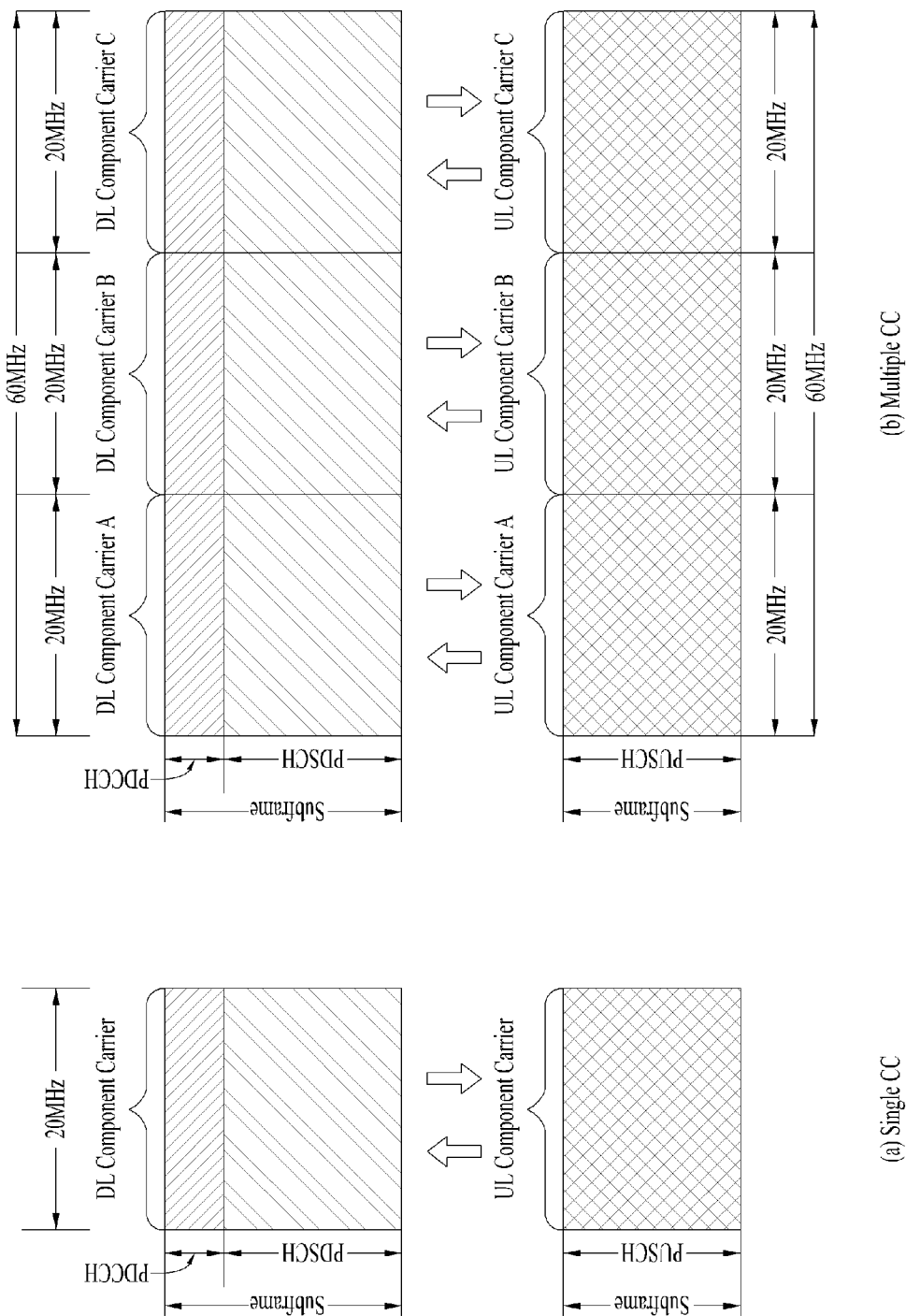
FIG. 8 is a diagram for explaining single-carrier communication and multi-carrier communication.

FIG. 8 is a diagram for explaining single-carrier communication and multi-carrier communication. Specially, FIG. 8(a) illustrates a subframe structure of a single carrier and FIG. 8(b) illustrates a subframe structure of multiple carriers.

Referring to FIG. 8(a), a general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). Referring to FIG. 8(b), three 20 MHz CCs in each of UL and DL are aggregated to support a BW of 60 MHz. The CCs may be contiguous or non-contiguous in the frequency domain. Although FIG. 8(b) illustrates that a BW of UL CC and a BW of DL CC are the same as each other and are symmetrical, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

The eNB may activate all or some of the serving CCs configured in the UE or deactivate some of the serving CCs for communication with the UE. The eNB may change the activated/deactivated CC, and may change the number of CCs which is/are activated or deactivated. If the eNB allocates available CCs to the UE cell-specifically or UE-specifically, at least one of the allocated CCs is not deactivated unless CC allocation to the UE is fully reconfigured or unless the UE performs handover. Such CC which is not deactivated unless CC allocation to the UE is full reconfigured will be referred to as a primary CC (PCC), and CC which may be activated/deactivated freely by the eNB will be referred to as secondary CC (SCC). The PCC and the SCC may be identified from each other on the basis of the control information. For example, specific control information may be set to be transmitted and received through a specific CC only. This specific CC may be referred to as the PCC, and the other CC(s) may be referred to as SCC(s).

In the meantime, the 3GPP LTE(-A) system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (PCell) or PCC, and a cell operating on a secondary frequency may be referred to as a secondary cell (SCell) or SCC. The carrier corresponding to the PCell on downlink will be referred to as a downlink primary CC (DL PCC), and the carrier corresponding to the PCell on uplink will be referred to as an uplink primary CC (UL PCC). A SCell means a cell that may be configured after completion of radio resource control (RRC) connection establishment and used to provide additional radio resources. The SCell may form a set of serving cells for the UE together with the PCell in accordance with capabilities of the UE. The carrier corresponding to the SCell on the downlink will be referred to as downlink secondary CC (DL SCC), and the carrier corresponding to the SCell on the uplink will be referred to as uplink secondary CC (UL SCC).

Although the UE is in RRC-CONNECTED state, if it is not configured by carrier aggregation or does not support carrier aggregation, a single serving cell configured by the PCell only exists.

The term "cell" used for carrier aggregation is distinguishable from the term "cell" indicating a certain local area where a communication service is provided by one eNB or one antenna group. In order to differentiate the "cell" indicating a certain local area from the "cell" used for carrier aggregation, in the present invention, the "cell" for carrier aggregation will be referred to as CC, whereas the "cell" for the local area will be simply referred to as cell.

According to a legacy LTE/LTE-A system, when a plurality of CCs is aggregated in the legacy LTE-A system, it is assumed that time synchronization of a UL/DL frame of an SCC is equal to that of a PCC under the condition that CCs which are not considerably separated in the frequency domain are aggregated. However, in the future, the probability is that a plurality of different CCs, which belongs to different bands or are separated by a significant distant on frequency, that is, which have different propagation characteristics, may be aggregated for the UE. In this case, the conventional assumption that time synchronization of the PCC is identical to time synchronization of the SCC may seriously affect synchronization of DL/UL signals of the SCC.

Meanwhile, in the case of an LCT CC, radio resources usable for transmission/reception of physical UL/DL channels and radio resources usable for transmission/reception of physical UL/DL signals, among radio resource operating on the LCT CC, are predetermined as described with reference to FIG. 1 to FIG. 7. In other words, the LCT CC should be configured to carry physical channels/signals not through an arbitrary time frequency in an arbitrary time resource but through a specific time frequency in a specific time resource according to type of a physical channel or physical signal. For example, physical DL control channels may be configured only on front OFDM symbol(s) among OFDM symbols of a DL subframe and a PDSCH cannot be configured on the front OFDM symbol(s) to which the physical DL control channels may be mapped. As another example, CRS(s) corresponding to antenna port(s) of an eNB is transmitted on REs illustrated in FIG. 6 in every subframe over the entire BW irrespective of DL BW of the eNB. Therefore, if the number of antenna ports of the eNB is 1, REs indicated by '0' in FIG. 6 cannot be used for transmission of other DL signals and, if the number of antenna ports of the eNB is 4, REs denoted by '0', '1', '2', and '3' in FIG. 6 cannot be used for transmission of other DL signals. In addition, there are various constraints about configuration of an LCT CC and these constraints have increased with advance of a communication system. Among such constraints, there are unnecessary constraints according to development of communication technology because of a communication technology level when the constraints were made. Moreover, for the same purpose, both constraints of conventional technology and constraints of new technology may be present. Due to considerable increase of the constraints, constraints introduced for development of a communication system serve as factors which cannot efficiently use radio resources of an associated CC. Accordingly, introduction of an NCT CC which is free from unnecessary constraints according to development of communication technology and is more simplified than conventional constraints has been discussed. Since the NCT CC is not a CC which is configured according to constraints of a legacy system, the NCT CC cannot be recognized by a UE implemented according to the legacy system. Hereinafter, a UE, which is implemented according to the legacy system and is incapable of supporting the NCT CC, is referred to as a legacy UE and a UE implemented to support the NCT CC is referred to as an NCT UE.

In a future LTE-A system, it is considered using the NCT CC as an SCC. Since it is not considered that a legacy UE uses the NCT CC, the legacy UE does not need to perform cell search, cell selection, and cell reselection on the NCT CC. If the NCT CC is used not as a PCC but only as an SCC, CCs can be more efficiently used because the NCT CC can reduce unnecessary constraints for the SCC relative to an LCT CC which is usable also as the PCC. However, time/frequency synchronization of the NCT CC may not be equal to synchronization of the PCC and may vary with change of a communication environment even though time/frequency synchronization of the NCT CC is acquired once. Therefore, an RS which can be used for tracking of time synchronization and/or frequency synchronization of the NCT CC is needed. In addition, an RS used when the UE detects the NCT CC in a neighbor cell search procedure is also needed. A CRS may be used for time/frequency synchronization of the NCT CC and for neighbor cell search using the NCT CC. The CRS may be configured on the NCT CC in the same form as in the legacy LTE/LTE-A system illustrated in FIG. 6 or may be configured on the NCT CC to have less density in the time or frequency domain than a CRS in the legacy LTE/LTE-A system.

The present invention proposes configuring CRSs on an NCT CC to have less density in the time domain than CRSs on an LCT CC of the legacy LTE/LTE-A system. Therefore, in the present invention, the NCT CC may not satisfy at least one of constraints indicating that a CRS should be configured on the NCT CC in every DL subframe, the CRS should be configured on the NCT CC with respect to each antenna port of an eNB, and a predetermined number of front OFDM symbols of a DL subframe should be reserved for transmission of a control channel such as a PDCCH over all frequency bands of the NCT CC. For example, the CRS may be configured on the NCT CC not in every subframe but in a predetermined number (>1) of subframes. Alternatively, only a CRS for one antenna port (e.g. antenna port 0) may be configured on the NCT CC regardless of the number of antenna ports of the eNB. CRSs of the present invention may not be used for data demodulation as opposed to legacy CRSs shown in FIG. 6. Accordingly, tracking RSs may be newly defined for tracking of time synchronization and/or frequency synchronization instead of the legacy CRSs used for channel status measurement and demodulation and the tracking RS may be configured in some subframes and/or some frequency resources on the NCT CC. Alternatively, a PDSCH may be configured on front OFDM symbols on the NCT CC, a PDCCH may be configured in an existing PDSCH region other than the front OFDM symbols, or the PDCCH may be configured using some frequency resources of the PDCCH. Hereinafter, an RS, which can be used by any UE for time synchronization and/or frequency synchronization of the NCT CC or for neighbor cell search and is transmitted in some subframes as opposed to the legacy LTE/LTE-A system, will be referred to as a common RS (CRS) irrespective of a name of an RS. The present invention proposes a method for configuring the locations of subframes including CRSs when the CRSs are transmitted only in some subframes. Embodiments of the present invention described below may be applied regardless of the locations of the CRSs in the frequency domain if the CRSs are transmitted not in every subframe but in some subframes. Hereinafter, a subframe in which CRSs are configured will be referred to as a CRS subframe irrespective of the locations and shapes of the CRSs in the subframes.

<1. Indication of CRS Subframe Location>

Figure 9:
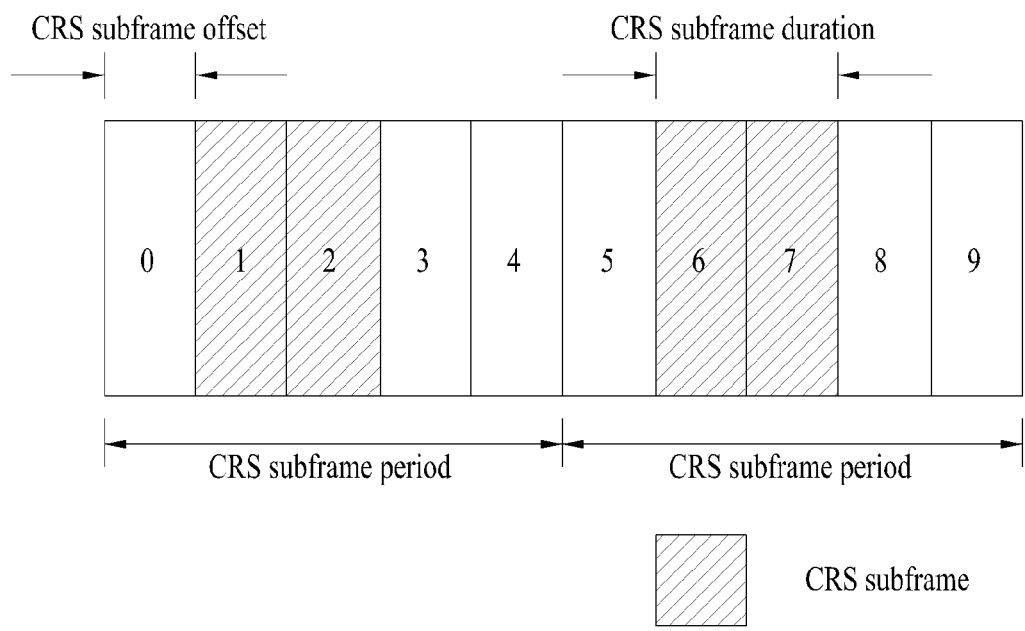
Figure 11:
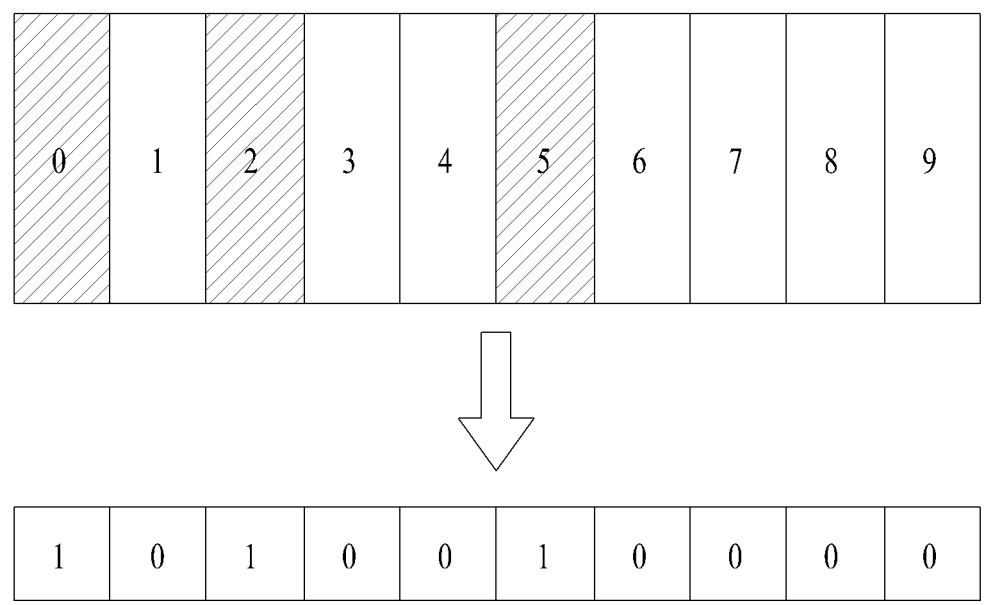

Various methods may be used to indicate the location of a CRS subframes. FIGS. 9 to 11 illustrate methods for configuring subframes for CRSs according to the present invention.

Referring to FIG. 9, CRS subframes may be configured by a CRS subframe period, a CRS subframe offset, and a CRS subframe duration. The CRS subframe period is a value indicating a period at which a CRS subframe occurs and corresponds to time from one CRS subframe configuration to the next same CRS subframe configuration. Referring to FIG. 9, since two consecutive CRS subframes are repeated every five subframes, a CRS subframe period in FIG. 9 is five subframes, that is, 5 ms. The CRS subframe offset corresponds to time from a specific reference point to the first CRS subframe. For example, referring to FIG. 9, assuming that a starting point of the CRS subframe period is subframe 0 and subframe 0 is the specific reference point, since time from the starting point of the CRS subframe period to the first CRS subframe is one subframe, the CRS subframe offset is one subframe, that is, 1 ms. The CRS subframe duration indicates a duration during which CRS subframes are continuously transmitted when a CRS subframe occurs once. In other words, the CRS subframe duration corresponds to the number of consecutive CRS subframes. Referring to FIG. 9, the CRS subframe duration is two subframes (2 ms).

CRS subframes may be indicated by multiple sets of CRS subframe periods, CRS subframe offsets, and CRS subframe durations. For example, referring to FIG. 10, in order to indicate the locations of the CRS subframes, two sets of CRS subframe periods, CRS subframe offsets, and CRS subframe durations, that is, <CRS subframe period 1, CRS subframe offset 1, CRS subframe duration 1>=<5, 0, 1> and <CRS subframe period 2, CRS subframe offset 2, CRS subframe duration 2>=<5, 1, 1> may be used. Part of a CRS subframe period, a CRS subframe offset, and a CRS subframe duration may be used to indicate the locations of the CRS subframes.

As another method for indicating the locations of CRS subframes, a location pattern of the CRS subframes may be used. The location pattern of the CRS subframes may be indicated by a bitmap. For instance, referring to FIG. 11, a 10-subframe pattern may be repeated in which 0th, 2nd, and 5th subframes are configured as the CRS subframes. In this case, the subframe pattern may be expressed by a 10-bit bitmap consisting of 10 bits corresponding one by one to 10 subframes. Referring to FIG. 11, a bitmap of "1, 0, 1, 0, 0, 1, 0, 0, 0, 0" may indicate that 0th, 2nd, and 5th subframes are configured as the CRS subframes.

<2. Fixed CRS Subframe Location>

When CRSs are transmitted only in some subframes, CRS subframes may be prefixed. The present invention proposes an embodiment in which a 0th subframe or 5th subframe is defined as a fixed CRS subframe or the 0th and 5th subframes are defined as fixed CRS subframes. Referring to Table 1, since both subframe 0 and subframe 5 are DL subframes in all TDD configurations, if at least one of the 0th and 5th subframes is fixed to a CRS subframe, CRS transmission to the UE can be guaranteed not only in FDD but also in TDD irrespective of TDD DL-UL configuration.

Additionally, the present invention proposes an embodiment in which part or all of PSS subframes and SSS subframes are defined as fixed CRS subframes on an NCT CC or a fixed CRS subframe(s) including the PSS subframes and/or the SSS subframes is defined. According to this embodiment, the number of subframes that the UE is to receive for an SS and a CRS can be reduced. Meanwhile, a beyond 3GPP LTE-A system considers configuring a low-cost/low-end UE based on data communication such as meter reading, water level measurement, use of a surveillance camera, and inventory reporting of a vending machine. Such a UE is referred to as a machine type communication (MTC) UE for convenience. Since the MTC UE transmits less data and intermittently transmits and receives UL/DL data, it is efficient to lower costs of the MTC UE and reduce battery consumption according to low data transmission rate and thus the MTC UE typically operates at a low power. According to the present invention, the number of subframes that MTC UEs operating at a low power should receive after waking from discontinuous reception (DRX) mode can also be reduced. In addition, the present invention proposes transmitting CRSs through an antenna port which is the same as an antenna port through which PSSs/SSSs are transmitted in order to raise gain of synchronization performance. In this way, if a transmission antenna port of the CRSs is the same as a transmission antenna port of the PSSs/SSSs, the UE may use both the PSSs/SSSs and the CRSs for time/frequency tracking on the premise that the PSSs/SSSs and CRSs are transmitted through the same antenna port so that tracking performance can be raised.

<3. Configurable CRS Subframe Location>

Although the locations of CRS subframes on an NCT CC may be fixed, the locations are configurable. The locations of the CRS subframes on the NCT CC may be configured by an eNB during initial access and may be continuously used or the locations of the CRS subframes on the NCT CC may be changed by configuration by the eNB in an connected state to the eNB through the NCT CC. The eNB may configure the CRS subframes for the UE, using methods proposed in the above-described <1. Indication of CRS subframe location>.

The locations of the CRS subframes may be indicated by one or multiple sets of CRS subframe periods, CRS subframe offsets, and CRS subframe durations as proposed with reference to FIGS. 9 and 10 in <1. Indication of CRS subframe location>. Alternatively, the locations of the CRS subframes may be configured by part of a CRS subframe period, a CRS subframe offset, and a CRS subframe duration. In this case, the CRS subframe offset may be associated with a cell ID. For example, assuming that three values of 0, 1, and 2 are usable as the CRS subframe offset, the CRS subframe offset may be defined as the same value as a value of "(Cell ID) mode 3" in order to reduce interference caused by CRSs of other cells.

The locations of the CRS subframes may be indicated by the CRS subframe pattern as proposed in <1. Indication of CRS subframe location>. To indicate the CRS subframe pattern, N (where N is a positive integer) patterns may be predefined and the eNB may signal a pattern number to be actually used among the N patterns to the UE so that the CRS subframe pattern may be indicated to the UE. Alternatively, the CRS subframe pattern may be indicated by the bitmap as illustrated in FIG. 11. In this case, the CRS subframe pattern may be determined in association with a cell ID. For example, when three CRS subframe patterns k (where k=0, 1, 2) are present, k may be defined as the same value of "(cell ID) mode 3" so that different CRS subframe patterns may be used according to cell IDs. Then the probability that CRSs of a serving cell collide with CRSs of another cells is reduced and thus interference caused by the CRSs of other cells with CRSs of the serving cell can be reduced.

Meanwhile, in order to raise gain of synchronization performance, the present invention proposes that CRSs transmitted in a configurable CRS subframe be transmitted through the same antenna port as an antenna port through which PSSs/SSSs are transmitted. Alternatively, it is proposed that an antenna port through which the PSSs/SSSs are transmitted be the same as an antenna port through which CRSs are transmitted. Thus, if the antenna port transmitting the CRSs is the same as the antenna port transmitting the PSSs/SSSs, since the UE may use both the PSSs/SSSs and the CRSs for time/frequency tracking on the premise that the PSSs/SSSs and the CRSs are transmitted through the same antenna, tracking performance can be raised.

<4. Fixed CRS Subframe Location and Additional CRS Subframe Location>

The locations of CRS subframes on an NCT CC may be fixed or may be configurable. As another method, the locations of some CRS subframes may be fixed and the locations of the other CRS subframes may be configurable. Here, a CRS subframe having a fixed location will be referred to as a fixed CRS subframe or a default CRS subframe. A subframe, which is configured according to a situation and is then indicated to the UE, will be referred to as configurable CRS subframe or an additional CRS subframe.

The present invention proposes an embodiment in which the location of the 0th subframe or 5th subframe is defined as a fixed CRS subframe or the 0th subframe and 5th subframe are defined as fixed subframes. Referring to Table 1, since both subframe 0 and subframe 5 are DL subframes in all TDD configurations, if at least one of the 0th and 5th subframes is fixed to a CRS subframe, CRS transmission to the UE can be guaranteed not only in FDD but also in TDD irrespective of TDD DL-UL configuration.

Alternatively, the present invention proposes an embodiment in which part or all of a PSS subframe and an SSS subframe are defined as fixed CRS subframes on an NCT CC or a fixed CRS subframe(s) including the PSS subframe and/or the SSS subframe is defined. According to this embodiment, the number of subframes that the UE should receive for SSs and CRSs can be reduced. In addition, the number of subframes that the MTC UEs operating at a low power should receive after waking from DRX mode can be reduced. In addition, the present invention proposes transmitting CRSs through an antenna port which is the same as an antenna port through which the PSSs/SSSs are transmitted in order to raise gain of synchronization performance. In this way, if a transmission antenna port of the CRSs is the same as a transmission antenna port of the PSSs/SSSs, the UE may use both the PSSs/SSSs and the CRSs for time/frequency tracking on the premise that the PSSs/SSSs and CRSs are transmitted through the same antenna port so that tracking performance can be raised.

When necessary, an additional CRS subframe may be further configured in addition to a default CRS subframe. The location of the additional CRS subframe may be indicated to the UE using the methods proposed in <1. Indication of CRS subframe location>.

<5. CRS Location in Subframe>

For CRSs on an NCT CC, the locations of CRSs in one subframe may be configured to be different from legacy locations and thus the density of the CRSs in one subframe can be lowered.

Figure 12:
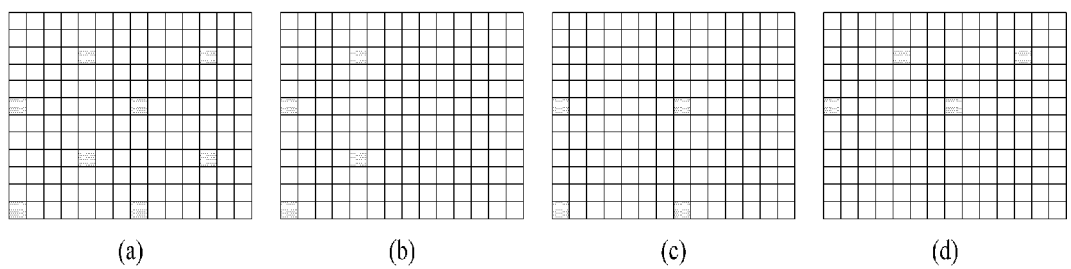
FIG. 12 illustrates a method for lowering the density of CRSs in a subframe according to the present invention.

FIG. 12 illustrates a method for lowering the density of CRSs in a subframe according to the present invention.

The density of CRSs in a subframe may be lowered by reducing the density of CRSs on the time axis. That is, in order to lower the density of CRSs in a subframe, CRSs may be transmitted only in part of slots or only on part of OFDM symbols of a subframe. Referring to FIG. 12, FIG. 12(a) illustrates REs on which antenna port 0 transmits CRSs among the CRS REs illustrated in FIG. 6. In the case of an LCT CC, CRSs of antenna port 0 are transmitted on the REs illustrated in FIG. 12(a) in every DL subframe. The CRSs of the LCT CC are transmitted in both slots of every subframe, whereas CRSs of the present invention may be defined as being transmitted only in the first slot or the second slot of a CRS subframe as illustrated in FIG. 12(b). Alternatively, CRSs on the LCT CC are transmitted on the 0th, 4th, 7th, and 11th OFDM symbols in every subframe, whereas the CRSs of the present invention may be defined as being transmitted only on the 0th and 7th OFDM symbols as illustrated in FIG. 12(c) or only on the 4th and 11th OFDM symbols.

The density of CRSs in a subframe may be lowered by reducing the density of CRSs on the frequency axis. That is, in order to lower the density of CRSs in a subframe, CRSs may be transmitted only in some RBs in a subframe or may be transmitted only on some subcarriers in one RB. Assuming that DL bandwidth is configured by 50 RBs, CRSs of an LCT CC are transmitted in the 50 RBs, whereas CRSs of the present invention may be defined as being transmitted in even-numbered RBs or odd-numbered RBs among the 50 RBs in order to lower the density of CRSs in a subframe. Alternatively, the CRSs of the LCT CC are transmitted on the 0th, 3th, 6th, and 9th subcarriers of an RB, whereas the CRSs of the present invention may be defined as being transmitted only on part of the 0th, 3th, 6th, and 9th subcarriers, for example, only on the 6th and 9th subcarriers as illustrated in FIG. 12(d) or as being transmitted only on the 0th and 3th subcarriers.

Some slots or some OFDM symbols of a CRS subframe may be configurably designated. The locations of some RBs in a CRS subframe or the locations of some subcarriers in one RB may be configurably designated for CRSs.

As described above, a scheme for lowering the density of CRSs on the time axis or frequency axis may be applied only to a specific subframe, a specific RB, or a specific RB of a specific subframe. Especially, if the density of CRSs is lowered on the frequency axis in a specific subframe, an embodiment of the present invention may be used in which a legacy CRS pattern is applied in some RBs as illustrated in FIG. 12(a) and CRSs are transmitted only on some subcarriers in some RBs as illustrated in FIG. 12(c) or 12(d). Alternatively, an embodiment of the present invention may be applied in which the legacy CRS pattern is applied to some subframes as illustrated in FIG. 12(a) and CRSs are transmitted only in a specific slot or specific OFDM symbols in some subframes as illustrated in FIG. 12(b) or FIG. 12(c).

As illustrated in FIG. 12, the locations of CRSs transmitted only in part of slots of a subframe or only on part of OFDM symbols of a subframe, the locations of CRSs transmitted in some RBs of a subframe or on some subcarriers of one RB, or the locations of CRSs transmitted on legacy REs on the time axis and/or the frequency axis may be differently designated according to a cell ID. When a CRS pattern used by a cell having a cell ID k is referred to as a CRS pattern k, a CRS pattern used by a cell having cell ID k+1 may be a pattern obtained by (cyclic-) shifting the CRS pattern k by a predetermined number of OFDM symbols and/or a prescribed number of subcarriers. Hence, interference between CRSs of neighbor cells can be mitigated. As another method for mitigating interference between CRSs of neighbor cells, when CRSs for antenna ports 0, 1, 2, and 3 are present as illustrated in <FIG. 6>, CRS locations for the respective antenna ports may be used as CRS locations of cells having four different cell IDs. That is, the CRSs may be transmitted as if up to four cells having different cell IDs are four different antenna ports. These four CRS locations may be used together with a subcarrier shift scheme of CRSs according to a cell ID.

Meanwhile, all or part of CRS REs for antenna port 0 and antenna port 1 currently used in current LTE may be used for CRSs on an NCT CC. Which one of antenna port 0 and antenna port 1 is used for CRSs of a specific cell may be determined by a cell ID. When CRSs for antenna port 0 and antenna port 1 are present, CRS REs for the two antenna ports may be used as CRS locations of two cells having different cell IDs. These two CRS locations may be used together with a frequency shift scheme for a CRS subcarrier according to a cell ID (e.g. refer to Equation 12 to Equation 14). Accordingly, the UE may be aware of information about a CRS location of the NCT CC and an antenna port transmitting CRSs through the cell ID. The eNB may inform the UE using the NCT CC of information as to which ones of CRS REs of antenna port 0 and CRS REs of antenna port 1 are used to transmit CRSs of a specific cell.

Alternatively, which ones of CRS REs of antenna port 0 and CRS REs of antenna port 1 are used for CRSs of a specific cell may be defined so as to be searched by the UE. As an example, information as to which ones of RE mappings of antenna port 0 and RE mappings of antenna port 1 are used for CRSs may be implicitly transmitted to the UE through a PSS/SSS. A method for this is described below by way of example.

a) The locations and/or durations of an OFDM symbol on which an SSS is transmitted and an OFDM symbol on which a PSS is transmitted may differ in the case in which antenna port 0 is used for CRSs and in the case in which antenna port 1 is used for CRSs. That is, an SSS symbol and a PSS symbol may differ according to an antenna port for CRSs (hereinafter, a CRS port).

b) The locations of subcarriers on which an SSS/PSS is transmitted may differ in the case in which antenna port 0 is used for CRSs and in the case in which antenna port 1 is used for CRSs. That is, SSS/PSS subcarriers may differ according to a CRS port.

c) The location of an OFDM symbol for a PSS may be swapped with the location of an OFDM symbol for an SSS in the case in which antenna port 0 is used for CRSs and in the case in which antenna port 1 is used for CRSs. For example, when CRSs are transmitted on CRS REs for antenna port 0, an SSS and a PSS may be defined as being transmitted on the 5th OFDM symbol and the 6th OFDM symbol of a PSS/SSS subframe, respectively, as illustrated in FIG. 3 and, when CRSs are transmitted on CRS REs for antenna port 1, the PSS and the SSS may be defined as being transmitted on the 5th OFDM symbol and the 6th OFDM symbol of the PSS/SSS subframe, respectively.

d) All or part of a), b), and c) may be used by combination.

RE mappings obtained by (cyclic) shifting all or part of RE mappings of antenna port 0 or antenna port 1 currently used in LTE with respect to an OFDM symbol axis and/or a subcarrier axis may be used for CRSs on an NCT CC. In this case, if the number of RE mappings obtained by (cyclic) shifting all or part of RE mappings of antenna port 0 or antenna port 1 with respect to the OFDM symbol axis and/or subcarrier axis is K, the K RE mappings, i.e. K CRS RE patterns, may be used for CRS locations of cells having different cell IDs. Accordingly, the UE may be aware of CRS locations on the NCT CC through a cell ID. Consequently, the UE may be aware of information about CRS locations on the NCT CC and an antenna port transmitting the CRSs through the cell ID. Alternatively, the eNB may inform the UE using the NCT CC of information as to which ones of RE mappings of port 0 and RE mappings of port 1 are used for CRSs of a specific cell.

The eNB may inform the UE of information as to which of CRS locations obtained by shifting all or part of RE mappings of antenna port 0 or antenna port 1 with respect to the OFDM symbol axis and/or subcarrier axis is used for the CRSs of the specific cell.

An antenna port for CRSs may be defined so that the UE should search the antenna port even though the eNB does not (explicitly) inform the UE of the information as to which of CRS locations obtained by shifting all or part of RE mappings of antenna port 0 or antenna port 1 with respect to the OFDM symbol axis and/or subcarrier axis is used for the CRSs of the specific cell. To this end, information as to which of CRS locations obtained by shifting all or part of RE mappings of antenna port 0 (, antenna port 1, antenna port 2, or antenna port 3), that is, all or part of CRS REs for antenna port 0 (, antenna port 1, antenna port 2, or antenna port 3) for CRSs, is used may be implicitly signalled through a PSS/SSS. A method for this may be as follows by way of example.

a) The locations and/or durations of an OFDM symbol on which an SSS is transmitted and an OFDM symbol on which a PSS is transmitted may differ according to the location of a CRS according to a shifted degree of all or part of RE mappings of antenna port 0, antenna port 1, antenna port 2, or antenna port 3 with respect to the OFDM symbol axis and/or the subcarrier axis. That is, an SSS symbol and a PSS symbol may differ according to a CRS location.

b) The location of a subcarrier on which an SSS/PSS is transmitted may differ according to the location of a CRS, for example, according to a shifted degree of all or part of RE mappings of antenna port 0, antenna port 1, antenna port 2, or antenna port 3 with respect to the OFDM symbol axis and/or the subcarrier axis. That is, an SSS/PSS subcarrier may differ according to a CRS location.

c) The location of an OFDM symbol for a PSS may be swapped with the location of an OFDM symbol for an SSS according to the location of a CRS, for example, according to a shifted degree of all or part of RE mappings of antenna port 0, antenna port 1, antenna port 2, or antenna port 3 with respect to the OFDM symbol axis and/or the subcarrier axis.

d) All or part of a), b), and c) may be used by combination.

<6. Combination of Legacy Subframe Structure and New Subframe Structure>

FIGS. 13 to 16 illustrate frame structures for CRS subframes according to embodiments of the present invention.

The present invention proposes an NCT frame structure on an NCT CC, including a frame structure for an NCT UE (hereinafter, a new frame structure) and a frame structure for a legacy UE (hereinafter, a legacy frame structure) so that both the NCT UE and the legacy UE may perform time synchronization, frequency synchronization, time/frequency tracking, and/or radio resource management (RRM) measurement on one CC.

Figure 13:
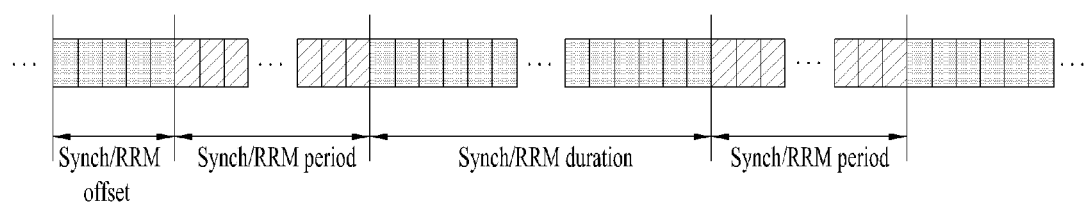

For an NCT frame structure according to an embodiment of the present invention, a subframe duration for synchronization and/or RRM measurement may be introduced. Hereinafter, the subframe duration for synchronization and/ or RRM measurement will be referred to as a synch/RRM duration, a distance between a specific reference point (e.g. a starting point of a radio frame) and a point at which a set of subframes corresponding to synch/RRM duration is started will be referred to as an synch/RRM offset, and a period during which subframe sets are configured will be referred to as a synch/RRM period. For example, a synch/RRM duration for a UE supporting an NCT CC may be configured as illustrated in FIG. 13.

Especially, a legacy frame structure for a legacy LTE/LTE-A system may be applied during a synch/RRM period. For example, referring to FIG. 14, a frame structure on an NCT CC may consist of legacy frame structures and new frame structures and the legacy frame structures may be periodically configured between the new frame structures.

In the present invention, information about a legacy frame offset, a legacy frame duration, and a new frame duration may be used to indicate a frame structure on an NCT CC. The legacy frame duration is a duration during which a legacy frame structure is used, the new frame duration is a duration during which a new frame structure is used, and the legacy frame offset is an offset at which the legacy frame structure is started from a reference time. The new frame duration may be replaced with a legacy frame period. Here, the legacy frame period refers to a period at which the legacy frame structure is transmitted or appears.

The information about the legacy frame offset, the legacy frame duration, and the new frame duration (or legacy frame period) may be fixed or configurable. When part or all of the legacy frame offset, the legacy frame duration, and the new frame duration (or legacy frame period) are configurable, the eNB may transmit all of the legacy frame offset, the legacy frame duration, and the new frame duration (or legacy frame period) or configurable information to the UE using the NCT CC.

Legacy UEs connected to a legacy CC may use a legacy frame structure of an NCT CC for measurement of reference signal received power (RSRP) and reference signal received quality (RSRQ) of a neighbor cell which is the NCT CC. The legacy UEs perform neighbor cell measurement (i.e. neighbor CC measurement) using legacy (sub)frames within a legacy frame duration to which a legacy frame structure out of an NCT frame structure is applied and do not perform neighbor cell measurement during a new frame duration during which a new frame structure is applied. To this end, an eNB connected to the legacy UEs may determine a measurement duration and a measurement period of the legacy UEs in consideration of the legacy frame duration and the new frame duration (or legacy frame period) used on an NCT CC. The eNB connected to the legacy UEs may receive information about the legacy frame duration and the new frame duration (or legacy frame period) of the NCR CC from an eNB of the NCT CC.

In this case, a subframe structure transmitted during the legacy frame period or a subframe structure transmitted during the new frame duration may be a legacy frame structure or may be a new frame structure having a different form from the legacy frame structure. Especially, for the new frame structure, a frame structure in which CRSs are transmitted only in part of subframes, proposed in the above description, may be used. Alternatively, a frame structure in which CRSs are transmitted only in part of slots in one subframe, proposed in the above description, may be used. Alternatively, a frame structure in which CRSs are transmitted in part of RBs or on part of subcarriers in a subframe may be used. That is, the new frame structure may be configured according to any one of the embodiments described in <1. Indication of CRS subframe location>, <2. Fixed CRS subframe location>, <3. Configurable CRS subframe location>, <4. Fixed CRS subframe location and additional CRS subframe location>, and/or <5. CRS location in subframe>. For example, referring to FIG. 15, during a new frame duration, not all subframes but only some subframes in the new frame duration may be configured as CRS subframes. In this way, if CRSs are transmitted only in some subframes, this is helpful to perform intercell interference coordination (ICIC) of UEs using an NCT CC during the new frame duration (or legacy frame period) because different subframes may be configured as the CRS subframes with respect to neighbor cells. Meanwhile, for the new frame structure, no CRSs may be transmitted in all subframes in the new frame duration. In the new frame structure, a PSS/SSS may have a time/frequency location different from that in a legacy frame. In other words, the PSS/SSS in the new frame structure may be transmitted using a time-frequency resource different from the PSS/SSS in the legacy frame.

Even during the new frame duration (or legacy frame period), legacy subframes may be transmitted in some or all subframes and information about the locations and duration of the legacy subframes in the new frame duration (or legacy frame period) may be configured and provided to the UE.

Figure 14:
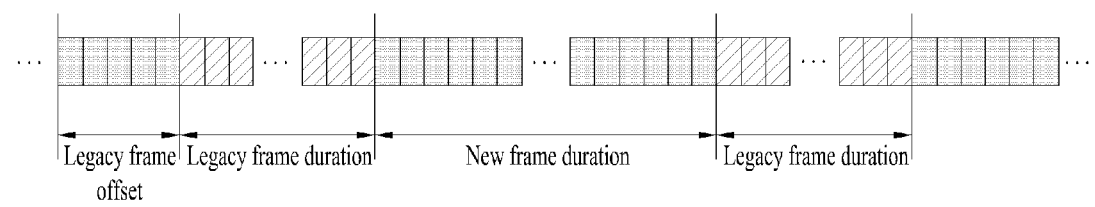
Figure 15:
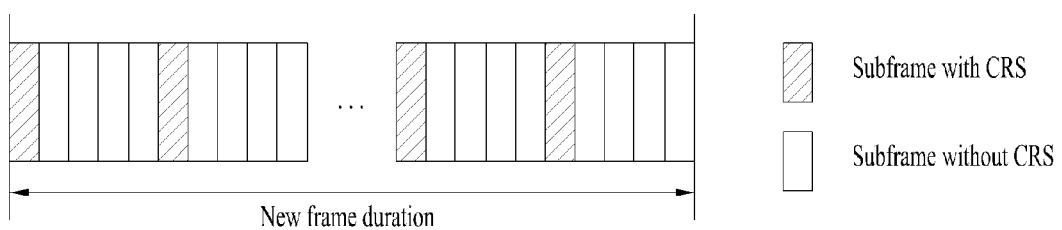
Figure 17:
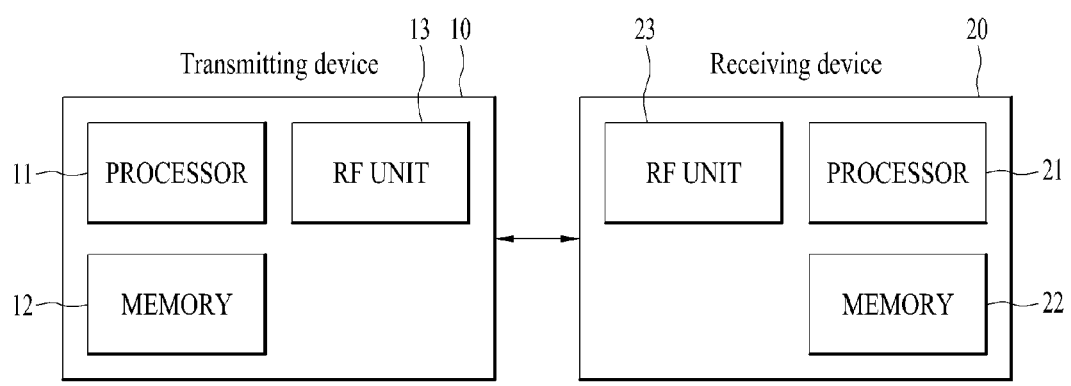
FIG. 17 is a block diagram illustrating elements of a transmitting device 10 and a receiving device 20 for implementing the present invention.

In summary, the frame structure as illustrated in FIG. 14 may be used on an NCT CC and, during the new frame duration (or legacy frame period), some subframes may be configured as CRS subframes as illustrated in FIG. 15. In other words, during the new frame duration (or legacy frame period), CRSs may be transmitted in CRS subframes determined according to any one of the embodiments described in <1. Indication of CRS subframe location>, <2. Fixed CRS subframe location>, <3. Configurable CRS subframe location>, and <4. Fixed CRS subframe location and additional CRS subframe location>. In this case, during the new frame duration (or legacy frame period), CRSs may be transmitted only in some subframes but, during the legacy frame duration (or new frame period), CRSs may be transmitted in successive subframes corresponding to the legacy frame duration. A starting point of a duration during which CRSs are transmitted in successive subframes may be designated through a legacy frame offset. A duration during which CRSs are transmitted in successive subframes and a duration during which CRSs are transmitted in part of subframes are configured using a legacy frame duration and a new frame duration (or legacy frame period), respectively, and a starting point of a duration during which CRSs are transmitted in successive subframes may be designated by a legacy frame offset. In addition, CRSs may be transmitted in successive subframes even during the new frame duration (or legacy frame period) and information about the locations and duration of the successive subframes in the new frame duration may be configured and provided to the UE.

In this way, if both the legacy frame structure and new frame structure are configured on one CC, this may be helpful in performing ICIC of an NCT UE during the new frame duration (or legacy frame period) and simultaneously a legacy UE may perform NCT CC measurement during the legacy frame duration.

The frame structure illustrated in FIG. 14 may be used on an NCT CC and, during the new frame duration (or legacy frame period), CRSs may be transmitted in only part of RBs or on part of subcarriers in a subframe according to the embodiment described in <5. CRS location in subframe>. In this case, during the new frame duration (or legacy frame period), CRSs may be transmitted only in part of RBs or on part of subcarriers, whereas, during the legacy frame duration (or new frame period), CRSs may transmitted over all bands.

Meanwhile, the frame structure illustrated in FIG. 14 may be used on an NCT CC and, during the new frame duration (or legacy frame period), CRSs may be transmitted only in part of RBs at a predetermined period (e.g. 5 ms). The legacy frame duration may be set to 1 ms (i.e. one subframe) as illustrated in FIG. 16(a) and, during the new frame duration, CRSs may be transmitted every 5 ms (i.e. every five subframes) through reduced bandwidth (only part of RBs or part of subcarriers) on the premise that CRSs are transmitted over all bands in subframes corresponding to the legacy frame duration. If the frame structure illustrated in FIG. 16(a) is used, both CRSs transmitted through the reduced bandwidth and CRSs transmitted through full bandwidth may be used for tracking of all NCT CCs and CRSs periodically transmitted through full bandwidth may be advantageously used for RRM measurement. In order to use CRSs transmitted on the NCT CC for both tracking and RRM measurement, for example, referring to FIG. 16(b), an NCT frame structure may be configured in which CRSs are transmitted at a predetermined period (e.g. 5 ms) and, in subframes in which the CRSs are transmitted (i.e. CRS subframes), CRS transmission using reduced bandwidth and CRS transmission using full bandwidth are repeated. The NCT frame structure illustrated in FIG. 16(b) may be configured such that the legacy frame duration is set to 1 ms (i.e. one subframe) and the new frame duration (or legacy frame period) is set to 9 ms (i.e. 9 subframes).

<7. Antenna Port of CRS for NCT CC>

A CRS for an NCT CC may be transmitted through antenna port 0, antenna port 1, antenna port 2, and/or antenna port 3 which has been used for legacy CRS transmission. Alternatively, the CRS for the NCT CC may be transmitted through newly designated antenna ports which have not been used for legacy CRS transmission. Alternatively, the CRS for the NCT CC may be transmitted through the same antenna port as an antenna port through which a PSS/SSS is transmitted for time/frequency tracking of the NCT CC using both the PSS/SSS and the CRS. Alternatively, the CRS for the NCT CC may be transmitted to satisfy the following conditions in association with the PSS/SSS.

a. Transmission timings (and/or reception timings) of the PSS/SSS and the CRS are equal.

b. The difference of transmission timings (and/or reception timings) of the PSS/SSS and the CRS is equal to or less than $\delta$ (where $\delta$ is a value greater than or equal to 0). Here, $\delta$ may be a value less than or equal to CP length (or "CP length"/2 or "CP length"/4).

c. The difference of estimated time offsets of the PSS/SSS and the CRS is equal to or less than $\alpha$ (where $\alpha$ is a value greater than or equal to 0).

d. Carrier frequencies of the PSS/SSS and the CRS are equal.

e. The difference of carrier frequencies of the PSS/SSS and the CRS is equal to less than $\gamma$ (where $\gamma$ is a value greater than or equal to 0).

f. The difference of estimated frequency offsets of the PSS/SSS and the CRS is equal to or less than $\beta$ (where $\beta$ is a value greater than or equal to 0).

g. The PSS/SSS and the CRS satisfy some or all conditions of a, b, and c and satisfy some or all conditions of d, e, and f.

That is, the CRS and the PSS/SSS of the NCT CC may be transmitted in a time-frequency resource satisfying some or all of a, b, c, d, g, f, and g. The UE may search or detect the CRS and PSS/SSS on an NCT CC on the premise that the CRS and the PSS/SSS are transmitted in the time-frequency resource satisfying some or all conditions of a, b, c, d, g, f, and g.

FIG. 23 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, the processor, RF unit, and memory included in the UE will be referred to as a UE processor, a UE RF unit, and a UE memory, respectively, and the processor, RF unit, and memory unit included in the eNB will be referred to as an eNB processor, an eNB RF unit, and an eNB memory, respectively.

CRS configuration information and a DL signal such as a CRS according to the embodiments of the present invention are transmitted to the UE by the RF unit of the eNB or an RF unit of a node controlled by the eNB processor. Hereinafter, the RF unit controlled by the eNB processor will also be referred to as the eNB RF unit. The eNB processor of the present invention may configure an NCT frame structure, a CRS subframe, a CRS slot, a CRS RB, and/or a CRS subcarrier according to any one of the above-described embodiments of the present invention and may control the eNB RF unit to transmit the configured information to the UE. However, when only a fixed CRS subframe is used, the eNB processor may not transmit indication information of the CRS subframe to the UE. The UE RF unit of the present invention may receive NCT frame structure information, CRS subframe configuration information, CRS slot information, CRS RB information, and/or CRS subcarrier information and the UE processor may receive CRSs based on the above information.

Specifically, the eNB processor may control the eNB RF unit to transmit CRSs in a fixed CRS subframe on an NCT CC, or the eNB processor may configure a subframe for CRSs on the NCT CC and control the eNB RF unit to transmit CRSs in the configured subframe. Alternatively, the eNB processor may control the eNB RF unit to transmit CRSs in at least one of the fixed CRS subframe and the configured subframe. The present invention proposes an embodiment in which a fixed CRS subframe(s) is defined to include at least one of the 0th subframe and the 5th subframe of a radio frame. Alternatively, the fixed CRS subframe(s) may be defined to include at least one of a PSS subframe and an SSS subframe. The eNB processor of the present invention may control the eNB RF unit to transmit CRSs and PSSs/SSSs through the same antenna port. In this case, the UE processor may perform tracking of time synchronization and/or frequency synchronization of the NCT CC on the premise that the CRSs and PSSs/SSSs are transmitted through the same antenna port. That is, the UE processor may perform synchronization of the NCT CC on the premise that the CRSs and PSSs/SSSs are transmitted through the same antenna port. When the eNB processor configures a CRS subframe, the eNB processor may control the eNB RF unit to transmit information according to the proposed methods in <1. Indication of CRS subframe location>. The UE processor may receive CRSs in the CRS subframe based on the information received by the UE RF unit. The eNB processor may control the eNB RF unit to transmit CRSs only in some slots of the CRS subframe or only on some OFDM symbols of the CRS subframe. The eNB processor may control the eNB RF unit to transmit CRSs only in some RBs of the CRS subframe or only on some subcarrier(s) of the CRS subframe. A slot, an OFDM symbol, an RB, or a subcarrier having CRSs in the CRS subframe may be fixed but may be designated by the eNB processor. The eNB processor may control the eNB RF unit to transmit information about a CRS slot, a CRS symbol, a CRS RB, or a CRS subcarrier of the CRS subframe and the UE processor may receive CRSs in the CRS slot, the CRS symbol, the CRS RB, or the CRS subcarrier based on the information received by the UE RF unit. The eNB processor may control the eNB RF unit to transmit CRSs on a time-shifted CRS symbol according to a cell ID and control the eNB RF unit to transmit CRSs in a frequency-shifted CRS RB or on a frequency-shifted CRS subcarrier according to a cell ID. The UE may be aware of the CRS symbol, CRS RB, and/or CRS subcarrier using a cell ID detected from a PSS and an SSS or a cell ID received from the eNB and receive CRSs through the CRS RB or the CRS subcarrier on the CRS symbol in the CRS subframe. A plurality of CRS patterns corresponding to locations of CRS REs in an RB pair may be defined and one of the CRS patterns may be used for transmission of CRSs of a specific cell. The eNB processor may control the eNB RF unit to transmit information indicating one of the predefined CRS patterns. The UE processor may be aware of CRS REs based on CRS pattern information received by the UE RF unit and receive CRSs through CRS REs of a CRS pattern corresponding to the CRS pattern information in the CRS subframe.

The eNB processor may control the eNB RF unit to transmit CRSs using all or part of CRS REs for antenna port 0 to antenna port 3 used as CRS ports in current LTE/LTE-A. The antenna ports and/or CRS REs to be used for transmission of CRSs may be determined by a cell ID and the eNB processor may control the eNB RF unit to transmit information thereabout. Alternatively, the eNB processor may control the eNB RF unit to transmit PSSs/SSSs in different time/frequency resources according to CRS antenna ports and/or CRS REs so that the UE processor may search antenna ports and/or CRS REs for CRSs. The eNB processor may (cyclic-) shift all or part of RE mappings of antenna port 0 or antenna port 1 for CRSs with respect to an OFDM symbol axis and/or a subcarrier axis and control the eNB RF unit to transmit information as to which of the cyclic-shifted RE mappings is used to the UE using the NCT CC. An antenna port for CRSs may be defined so that the UE processor may search the antenna port even though the eNB does not (explicitly) inform the UE of information as to which of CRS locations obtained by all or part of RE mappings of antenna port 0 or antenna port 1 with respect to the OFDM symbol axis and/or the subcarrier axis. To this end, information as to which of CRS locations obtained by shifting all or part of RE mappings of antenna port 0 (, antenna port 1, antenna port 2, or antenna port 3) for CRSs, that is, all or part of CRS REs for antenna port 0 (, antenna port 1, antenna port 2, or antenna port 3), is used may be implicitly signalled through the PSS/SSS.

An NCT frame structure may be configured according to any one of the embodiments described in <6. Combination of legacy subframe structure and new frame structure> so that all of the eNB processor of the present invention, the NCT UE on one CC, and the legacy UE may perform time synchronization, frequency synchronization, time/frequency tracking, and/or RRM measurement. The eNB processor may control the eNB RF unit to transmit information about the configured NCT frame structure. The UE processor may control the UE RF unit to receive, during a legacy frame duration, CRSs over all DL bands in every subframe based on information about the NCT frame structure received by the UE RF unit and control the UE RF unit to receive, during a new frame duration, CRSs on CRS symbols of the fixed CRS subframe and/or the configured CRS subframe, based on information about the NCT frame structure received by the UE RF unit.

The eNB processor may control the eNB RF unit to transmit CRSs for the NCT CC through antenna port 0 to antenna port 3 which have been used for legacy CRS transmission and the UE processor may detect CRSs on the premise that CRSs are transmitted through at least one of antenna port 0 to antenna port 3 which have been used for CRS transmission. The eNB processor may control the eNB RF unit to transmit CRSs for the NCT CC through a newly designated antenna port which has not been used. The eNB processor may control the eNB RF unit to transmit CRSs for the NCT CC through the same antenna port as an antenna port transmitting PSSs/SSSs. The eNB processor may control the eNB RF unit to transmit CRSs satisfying the conditions described in <7. Antenna port of CRS for NCT CC>.

CRSs for the above-described NCT CC may be used for time/frequency tracking. CRSs according to any embodiment described in <1. Indication of CRS subframe location>, <2. Fixed CRS subframe location>, <3. Configurable CRS subframe location>, <4. Fixed CRS subframe location and additional CRS subframe location>, <5. CRS location in subframe>, <6. Combination of legacy subframe structure and new subframe structure>, and <7. Antenna port of CRS for NCT CC> may be used for time/frequency tracking on the NCT CC.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a base station, a relay, a UE, or other devices in a wireless communication system.

The invention claimed is:

1. A method for receiving a reference signal by a user equipment, the method comprising:
receiving frame configuration information indicating a legacy frame duration or a new frame duration for a carrier; and
receiving a common reference signal of each of one or more antenna ports in every subframe belonging to the legacy frame duration and a common reference signal of a specific antenna port among the one or more antenna ports in a subset of subframes among a plurality of subframes belonging to the new frame duration based on the frame configuration information,
wherein the common reference signal of each of the one or more antenna ports is received through every resource block belonging to an entire bandwidth of the carrier, and
wherein the common reference signal of the specific antenna port is received through resource blocks belonging to a part of the entire bandwidth of the carrier.

2. The method according to claim 1, wherein the specific antenna port is the same as an antenna port from which a synchronization signal of the carrier is received.

3. The method according to claim 1, wherein the common reference signal of the specific antenna port is received in a state satisfying a predetermined condition with a synchronization signal.

4. The method according to claim 1, wherein the subset of subframes includes at least a subframe configured for the common reference signal of the specific antenna port or a fixed subframe.

5. The method according to claim 4, wherein the fixed subframe includes at least one of subframes including a synchronization signal.

6. A user equipment for receiving a reference signal, the user equipment comprising:
a radio frequency (RF) unit, and
a processor configured to:
control the RF unit to receive frame configuration information indicating a legacy frame duration or a new frame duration for a carrier; and
control the RF unit to receive a common reference signal of each of one or more antenna ports in every subframe belonging to the legacy frame duration and a common reference signal of a specific antenna port among the one or more antenna ports in a subset of subframes among a plurality of subframes belonging to the new frame duration based on the frame configuration information,
wherein the common reference signal of each of the one or more antenna ports is received through every resource block belonging to an entire bandwidth of the carrier, and
wherein the common reference signal of the specific antenna port is received through resource blocks belonging to a part of the entire bandwidth of the carrier.

7. The user equipment according to claim 6, wherein the specific antenna port is the same as an antenna port from which a synchronization signal of the carrier is received.

8. The user equipment according to claim 6, wherein the common reference signal of the specific antenna port is received in a state satisfying a predetermined condition with a synchronization signal.

9. The user equipment according to claim 6, wherein the subset of subframes includes at least a subframe configured for the common reference signal of the specific antenna port or a fixed subframe.

10. The user equipment according to claim 9, wherein the fixed subframe includes at least one of subframes including a synchronization signal.

11. A method for transmitting a reference signal by a base station, the method comprising:
transmitting frame configuration information indicating a legacy frame duration or a new frame duration of a carrier; and
transmitting a common reference signal of each of one or more antenna ports of the base station in every subframe belonging to the legacy frame duration and a common reference signal of a specific antenna port among the one or more antenna ports in a subset of subframes among a plurality of subframes belonging to the new frame duration based on the frame configuration information,
wherein the common reference signal of each of the one or more antenna ports is transmitted through every resource block belonging to an entire bandwidth of the carrier, and
wherein the common reference signal of the specific antenna port is transmitted through resource blocks belonging to a part of the entire bandwidth of the carrier.

12. The method according to claim 11, wherein the specific antenna port is the same as an antenna port through which a synchronization signal of the carrier is transmitted.

13. The method according to claim 11, wherein the common reference signal of the specific antenna port is transmitted in a state satisfying a predetermined condition with a synchronization signal.

14. The method according to claim 11, wherein the subset of subframes includes at least a subframe configured for the common reference signal of the specific antenna port or a fixed subframe.

15. The method according to claim 14, wherein the fixed subframe includes at least one of subframes including a synchronization signal.

16. A base station for transmitting a reference signal, the base station comprising:
a radio frequency (RF) unit, and
a processor configured to:
control the RF unit to transmit frame configuration information indicating a legacy frame duration or a new frame duration of a carrier; and
control the RF unit to transmit a common reference signal of each of one or more antenna ports of the base station in every subframe belonging to the legacy frame duration and a common reference signal of a specific antenna port among the one or more antenna ports in a subset of subframes among a plurality of subframes belonging to the new frame duration based on the frame configuration information,
wherein the common reference signal of each of the one or more antenna ports is transmitted through every resource block belonging to an entire bandwidth of the carrier, and
wherein the common reference signal of the specific antenna port is transmitted through resource blocks belonging to a part of the entire bandwidth of the carrier.

17. The base station according to claim 16, wherein the specific antenna port is the same as an antenna port through which a synchronization signal of the carrier is transmitted.

18. The base station according to claim 16, wherein the processor controls the RF unit to transmit the common reference signal of the specific antenna port in a state satisfying a predetermined condition with a synchronization signal.

19. The base station according to claim 16, wherein the subset of subframes includes at least a subframe configured for the common reference signal of the specific antenna port or a fixed subframe.

20. The base station according to claim 19, wherein the fixed subframe includes at least one of subframes including a synchronization signal.

* * * * *